US012701456B2

(12) United States Patent
Bang et al.

(10) Patent No.: US 12,701,456 B2
(45) Date of Patent: Aug. 4, 2026

(54) ELECTRONIC DEVICE FOR PROVIDING INFORMATION OF ACCESS POINT IN WIRELESS COMMUNICATION SYSTEM AND METHOD THEREOF

(71) Applicant: SAMSUNG ELECTRONICS CO., LTD., Suwon-si (KR)

(72) Inventors: Hyejung Bang, Suwon-si (KR); Buseop Jung, Suwon-si (KR); Beomjip Kim, Suwon-si (KR); Hakkwan Kim, Suwon-si (KR); Dooho Lee, Suwon-si (KR); Sunkey Lee, Suwon-si (KR); Soonho Lee, Suwon-si (KR); Wonjun Jang, Suwon-si (KR); Namju Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 18/223,388

(22) Filed: Jul. 18, 2023

(65) Prior Publication Data

US 2023/0362711 A1 Nov. 9, 2023

Related U.S. Application Data

(63) Continuation of application No. PCT/KR2021/002880, filed on Mar. 9, 2021.

(30) Foreign Application Priority Data

Jan. 19, 2021 (KR) ........................ 10-2021-0007481

(51) Int. Cl.
*H04W 28/02* (2009.01)
*H04W 28/086* (2023.01)

(52) U.S. Cl.
CPC ... *H04W 28/0268* (2013.01); *H04W 28/0861* (2023.05)

(58) Field of Classification Search
None
See application file for complete search history.

(56) References Cited

U.S. PATENT DOCUMENTS 10,390,278 B2 * 8/2019 Yu ......................... H04W 36/08
2011/0283001 A1 11/2011 Jung et al.
(Continued)

FOREIGN PATENT DOCUMENTS

CN 108712715 A 10/2018
EP 3 264 828 A1 1/2018
(Continued)

OTHER PUBLICATIONS

Communication dated Oct. 14, 2021, issued by the International Searching Authority in counterpart International Application No. PCT/KR2021/002880 (PCT/ISA/210).
(Continued)

*Primary Examiner* — Eunsook Choi
(74) *Attorney, Agent, or Firm* — Sughrue Mion, PLLC

(57) ABSTRACT

Disclosed are an electronic device, a method, and a non-transitory computer-readable medium for providing information of an access point in a wireless communication system, the method may include providing a tethering service to an external electronic device in a mobile hotspot mode; searching for at least one access point (AP) capable of replacing the tethering service for the external electronic device, wherein the at least one AP is capable of replacing the tethering service while providing the tethering service; and based on detecting the at least one AP capable of replacing the tethering service, transmitting configuration
(Continued)

information about the at least one AP to connect to the at least one AP to the external electronic device.

19 Claims, 12 Drawing Sheets

(56) References Cited

U.S. PATENT DOCUMENTS

| | | | | |
|---|---|---|---|---|
| 2013/0247117 | A1* | 9/2013 | Yamada | H04W 12/06 |
| | | | | 340/12.5 |
| 2014/0337923 | A1 | 11/2014 | Anders et al. | |
| 2015/0282195 | A1* | 10/2015 | Farhadi | H04W 72/0453 |
| | | | | 370/229 |
| 2015/0296427 | A1 | 10/2015 | Lee et al. | |
| 2016/0037444 | A1 | 2/2016 | Jung et al. | |
| 2017/0257819 | A1* | 9/2017 | McCann | H04L 67/56 |
| 2017/0295448 | A1 | 10/2017 | McCann et al. | |
| 2017/0311249 | A1* | 10/2017 | Lopes | H04W 36/302 |
| 2018/0124669 | A1* | 5/2018 | Yu | H04W 48/16 |
| 2018/0352489 | A1* | 12/2018 | Anchan | H04W 48/16 |
| 2019/0029069 | A1 | 1/2019 | Shim | |
| 2019/0150093 | A1 | 5/2019 | Kweon et al. | |
| 2020/0195504 | A1 | 6/2020 | Tao | |
| 2020/0252851 | A1* | 8/2020 | Tukmanov | H04W 36/08 |

FOREIGN PATENT DOCUMENTS

| | | | |
|---|---|---|---|
| EP | 3 576 441 | A1 | 12/2019 |
| JP | 2013-219740 | A | 10/2013 |
| KR | 10-2011-0126359 | A | 11/2011 |
| KR | 10-2012-0139346 | A | 12/2012 |
| KR | 10-2013-0060072 | A | 6/2013 |
| KR | 10-2014-0093113 | A | 7/2014 |
| KR | 10-2015-0118434 | A | 10/2015 |
| KR | 10-2016-0009599 | A | 1/2016 |
| KR | 10-2016-0015726 | A | 2/2016 |
| KR | 10-2017-0091397 | A | 8/2017 |
| WO | 2018/194617 | A1 | 10/2018 |
| WO | 2019/177231 | A1 | 9/2019 |
| WO | 2020/092971 | A1 | 5/2020 |

OTHER PUBLICATIONS

Communication dated Oct. 14, 2021, issued by the International Searching Authority in counterpart International Application No. PCT/KR2021/002880 (PCT/ISA/237).
"Wi-Fi Easy Connect™ Specification, Version 2.0," Wi-Fi Alliance, Dec. 14, 2020, Total 226 pages.
Communication dated Jun. 12, 2024, issued by the European Patent Office in counterpart European Application No. 21921408.7.
Communication issued on Dec. 20, 2025 by the Korean Ministry of Intellectual Property (MOIP) in Korean Patent Application No. 10-2021-0007481.

* cited by examiner

Configurator

Enrollee Clients

ELECTRONIC DEVICE FOR PROVIDING INFORMATION OF ACCESS POINT IN WIRELESS COMMUNICATION SYSTEM AND METHOD THEREOF

CROSS-REFERENCE TO RELATED APPLICATIONS

This application is a bypass continuation application of International Application No. PCT/KR2021/002880, filed on Mar. 9, 2021, in the Korean Intellectual Property Office, which claims priority from Korean Patent Application No. 10-2021-0007481, filed on Jan. 19, 2021, at the Korean Intellectual Property Office, the disclosures of which are incorporated by reference herein in their entireties.

BACKGROUND

1. Field

Various embodiments of the disclosure relate to an electronic device for providing information about an access point (AP) in a wireless communication system, and a method thereof.

2. Related Art

Wireless communication systems are under extensive development to provide various types of communication services such as voice or data. In general, a wireless communication system is a multiple access system that may support communication with multiple users by sharing available system resources (e.g., time resources, frequency resources, bandwidth resources, or output power resources). Multiple access systems may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Along with the recent development of information communication technology, various wireless communication technologies have been developed. In particular, wireless local area network (WLAN) is a wireless computer network technology that allows devices such as smartphones, personal digital assistants (PDAs), and laptop computers to wirelessly connect to the Internet in a limited area such as homes, schools, offices, or commercial facilities based on a radio frequency technology. All devices connectable to a wireless medium in the WLAN are referred to as stations (STAs), and the STAs may operate as wireless access points (APs) or clients. An AP operates as a wireless router and may be a base station (BS) for a wireless network. The AP may provide Internet service by transmitting and receiving radio frequency (RF) signals to and from devices capable of wireless communication. Non-AP devices may access the Internet through the AP.

The WLAN has recently provided a process of enabling a wireless fidelity (Wi-Fi) device to easily and safely connect to a network based on the Wi-Fi standard provided by the Wi-Fi Alliance (WFA). In particular, the process is more important in technical fields such as smart homes or Internet of things (IoT) including devices that have no user interface or only a limited user interface. To configure a Wi-Fi network connection of a device, network information and security information are required for the device. Adding a device that has no user interface or a limited user interface to a network is very cumbersome, thereby causing user inconvenience, or is often performed in a different way by each manufacturer. Accordingly, techniques using a standardized and simple configuration method for adding electronic devices to a network are being developed in order to allow users to more freely select products from various manufacturers and provide a consistent user environment.

Tethering refers to a function of sharing an Internet connection of an electronic device capable of accessing a network with another electronic device. The other electronic device may access the electronic device providing tethering by a wireless access technology such as WLAN (or Wi-Fi) or Bluetooth or a physical connection using a cable such as a universal serial bus (USB). When tethering is performed based on WLAN, the electronic device may act as a portable wireless AP forming a personal hotspot or a mobile hotspot, which is a physical area allowing the other electronic device to connect to the Internet. The electronic device supporting a mobile hotspot may provide the Internet service of an external network to the other electronic device through a Wi-Fi connection to the other electronic device receiving the tethering service. Compared to other wireless access technologies such as Bluetooth, the Internet service may be provided to another farther electronic device at a higher speed.

SUMMARY

An electronic device using a wireless fidelity (Wi-Fi) communication service may have limited mobility. When the electronic device moves out of the coverage area of an access point (AP), it may lose the connection to the AP and no longer maintain the Wi-Fi communication service in the absence of any adjacent available AP. When there is an adjacent electronic device in a hotspot mode (which may be referred to as a hotspot electronic device) in which a tethering service is provided, the external electronic device may connect to the hotspot electronic device and share the Internet connection of the hotspot electronic device. When the external electronic device uses the tethering service for a long time through the hotspot electronic device, the hotspot electronic device may suffer from excessive power consumption and/or cellular data usage. Since the hotspot electronic device is connected to the other external electronic device requiring the tethering service through a wireless connection such as the WLAN, power consumption of the hotspot electronic device may become a great burden in maintaining the tethering service. Moreover, when the electronic device enters the area of a fixed AP such as a home or office again while using the tethering service, a user may need repeated user interactions such as directly terminating or requesting to terminate the tethering service of the hotspot electronic device, and connecting the electronic device to the fixed AP.

Various embodiments of the disclosure may provide an electronic device for, when a hotspot electronic device discovers an AP capable of replacing a tethering service while providing the tethering service to an external electronic device, transmitting information about the AP to the external electronic device, and a method of operating the same.

Various embodiments of the disclosure may provide an electronic device for inducing Wi-Fi handover to an AP to an external electronic device using a tethering service, and a method of operating the same.

Various embodiments of the disclosure may provide an electronic device for providing information required for connecting to an AP to an external electronic device during a tethering service.

According to an embodiment of the disclosure, an electronic device for providing information about an access point (AP) in a wireless communication system includes a communication module and at least one processor functionally connected to the communication module. The at least one processor may be configured to provide a tethering service to an external electronic device through the communication module in a mobile hotspot mode. The at least one processor may be configured to search for at least one access point (AP) capable of replacing the tethering service for the external electronic device through the communication module, wherein the at least one AP is capable of replacing the tethering service while providing the tethering service. The at least one processor may be configured to, based on detecting the at least one AP capable of replacing the tethering service, transmit configuration information about the at least one AP to connect to the at least one AP to the external electronic device through the communication module.

According to an embodiment of the disclosure, a method of providing information about an AP by an electronic device in a wireless communication system is disclosed. The method may include providing a tethering service to an external electronic device in a mobile hotspot mode. The method may include searching for at least one access point (AP) capable of replacing the tethering service for the external electronic device, wherein the at least one AP is capable of replacing the tethering service while providing the tethering service. The method may include, based on detecting the at least one AP capable of replacing the tethering service, transmitting configuration information about the at least one AP to connect to the at least one AP to the external electronic device.

According to an embodiment of the disclosure, a non-transitory computer-readable medium having recorded thereon a program for implementing an operating method of an electronic device to provide information about an access point (AP), the operating method includes providing a tethering service to an external electronic device in a mobile hotspot mode; searching for at least one access point (AP) capable of replacing the tethering service for the external electronic device, wherein the at least one AP is capable of replacing the tethering service while providing the tethering service; and based on detecting the at least one AP capable of replacing the tethering service, transmitting configuration information about the at least one AP to connect to the at least one AP to the external electronic device.

DETAILED DESCRIPTION

Figure 1:
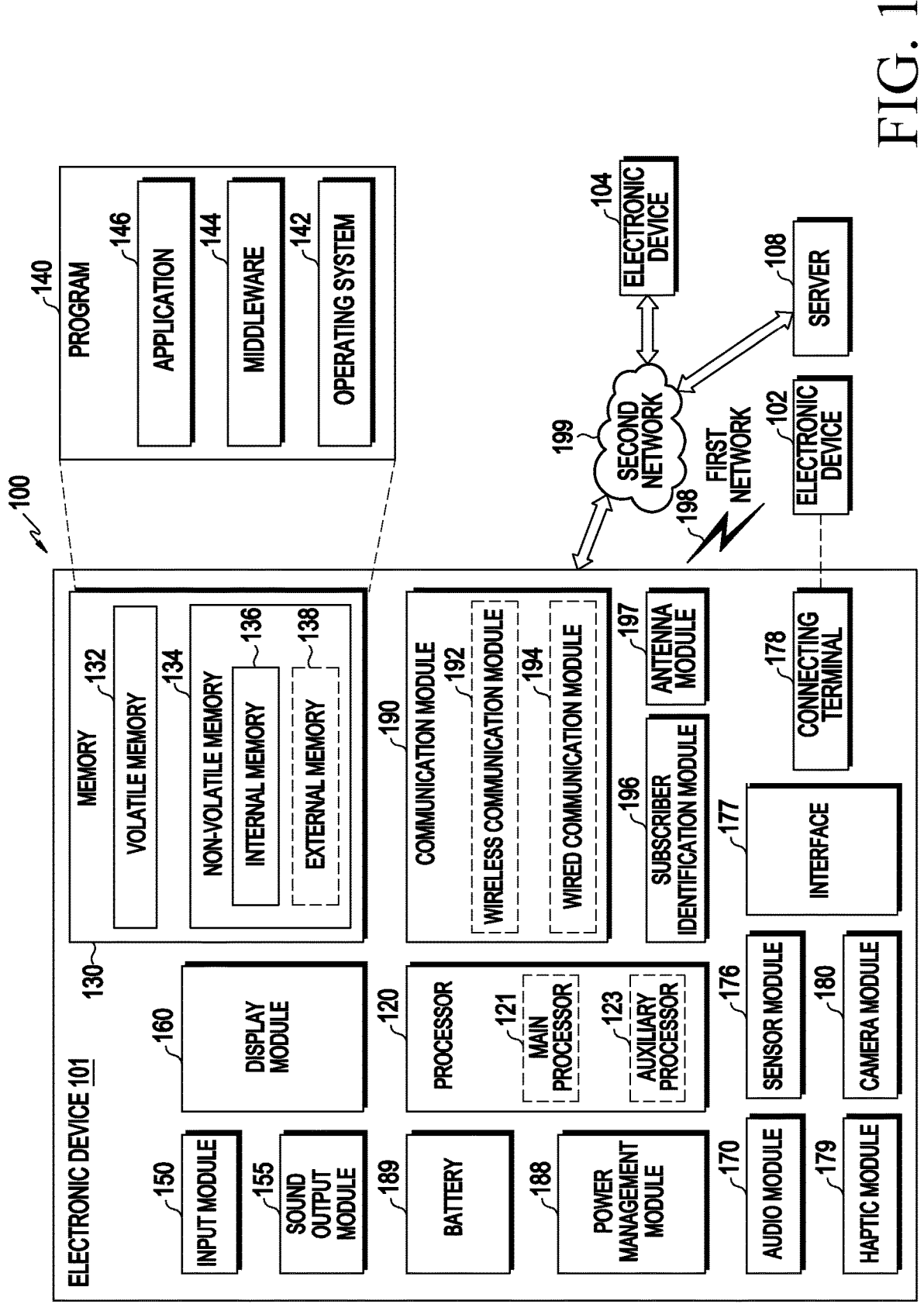
FIG. 1 is a block diagram illustrating an electronic device in a network environment according to various embodiments.

Various embodiments of the disclosure will be described below in detail with reference to the attached drawings. Lest it should obscure the subject matter of various embodiments of the disclosure, a detailed description of a generally known function or structure will be avoided. The terms as described later are defined in consideration of functions in the embodiment of the disclosure, and may be changed according to the intention of a user or an operator, or customs. Therefore, the definitions should be made by the meaning of each term lying within.

The technical terms as used in the disclosure are provided merely to describe a specific embodiment, not intended to limit an embodiment of the disclosure. Further, unless otherwise defined, the technical terms as used in the disclosure should be interpreted as the same meanings as generally understood by those skilled in the art, and should not be interpreted as excessively inclusive or excessively narrow meanings. In addition, when the technical terms used in the disclosure are incorrect ones that do not accurately express the spirit of the disclosure, they should be understood by being replaced with technical terms that can be correctly understood by those skilled in the art. In addition, the general terms used in the disclosure should be interpreted as defined in dictionaries or according to the context, and should not be interpreted as excessively narrow meanings.

Singular forms used in the disclosure include plural referents unless the context clearly dictates otherwise. In this disclosure, the term "have", "may have", "include", or "may include" should not be interpreted as necessarily including multiple components or operations described in the specification, and should be interpreted as excluding some of the components or operations or further including additional components or steps.

Further, the terms including first or second as used in the disclosure may be used to describe various components, and the components should not be limited by the terms. The terms are used only for the purpose of distinguishing one component from another. For example, a first component may be called a second component, and vice versa without departing from the scope of the disclosure.

When it is said that a component is "connected to" or "coupled to" another component, the component may be connected or coupled to the other component directly or with a third component in between. On the other hand, when it is said that a component is "directly connected to" or "directly coupled to" another component, it should be understood that there is no third component in between.

Various embodiments of the disclosure will be described in detail with reference to the attached drawings. Like reference numerals are assigned to the same or similar components irrespective of the drawing numbers, and in this regard, a redundant description will be avoided. Further, a detailed description of a known technology will be omitted lest it should obscure the subject matter of the disclosure. Further, it should be noted that the attached drawings are presented merely to help understanding of the spirit of the disclosure, and should not be construed as limiting the spirit of the disclosure. The spirit of the disclosure should be interpreted as encompassing all modifications, equivalents, and alternatives in addition to the attached drawings.

Hereinafter, a terminal will be described in various embodiments of the disclosure. A terminal may be referred to as an electronic device, a mobile station, a mobile equipment (ME), a user equipment (UE), a user terminal (UT), a subscriber station (SS), a wireless device, a handheld device, and an access terminal (AT). Alternatively, in various embodiments of the disclosure, a terminal may be a device having a communication function, such as a mobile phone, a personal digital assistant (PDA), a smartphone, a wireless modem, and a laptop computer.

Alternatively, in specifically describing various embodiments of the present disclosure, reference will be made to standards provided by wireless access standardization organizations, the Institute of Electrical and Electronics Engineers (IEEE) and the Wi-Fi alliance (WFA). However, the subject matter of the disclosure is also applicable to other communication systems having a similar technical background by making a slight modification without greatly departing from the scope of the disclosure, as judged by those skilled in the art.

FIG. 1 is a block diagram illustrating an electronic device 101 in a network environment 100 according to various embodiments.

FIG. 1 is a block diagram illustrating the electronic device 101 in the network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
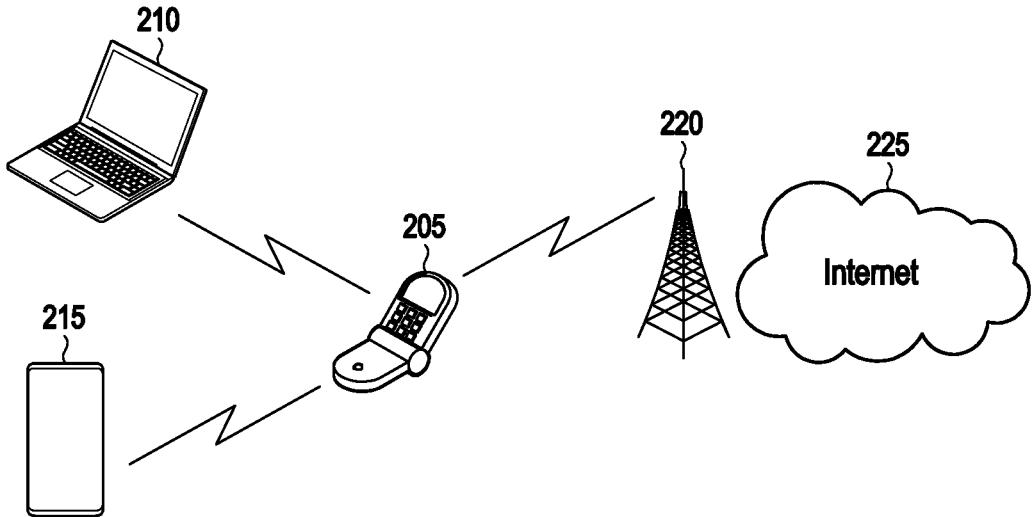
FIG. 2 is a block diagram illustrating the configuration of a wireless communication system providing a tethering service according to an embodiment of the disclosure.

FIG. 2 is a block diagram illustrating the configuration of a wireless communication system providing a tethering service according to an embodiment of the disclosure.

Referring to FIG. 2, an electronic device 205 (e.g., the electronic device 101 of FIG. 1) may include a communication module (e.g., the wireless communication module 192 of FIG. 1) including a cellular communication circuit capable of accessing a cellular base station (BS) 220 and a wireless local area network (WLAN) communication circuit supporting wireless fidelity (Wi-Fi) communication, and may connect to the cellular BS 220 using the cellular communication circuit and access the Internet 225 through a cellular network of the cellular BS 220. The electronic device 205 may also support a mobile hotspot that allows it to share the connection to the Internet 225 with at least one external electronic device 210 and 215. In a mobile hotspot mode, the electronic device 205 may operate as a mobile access point (AP) that establishes a Wi-Fi connection with the at least one external electronic device 210 and 215 through the WLAN communication circuit and provides a tethering service to the external electronic devices 210 and 215. The external electronic devices 210 and 215 are electronic devices capable of supporting Wi-Fi communication (e.g., the electronic device 101 of FIG. 1 or a computer device equipped with a communication function, such as a notebook or laptop computer), and may be client devices using the tethering service of the mobile hotspot mode.

Figure 3:
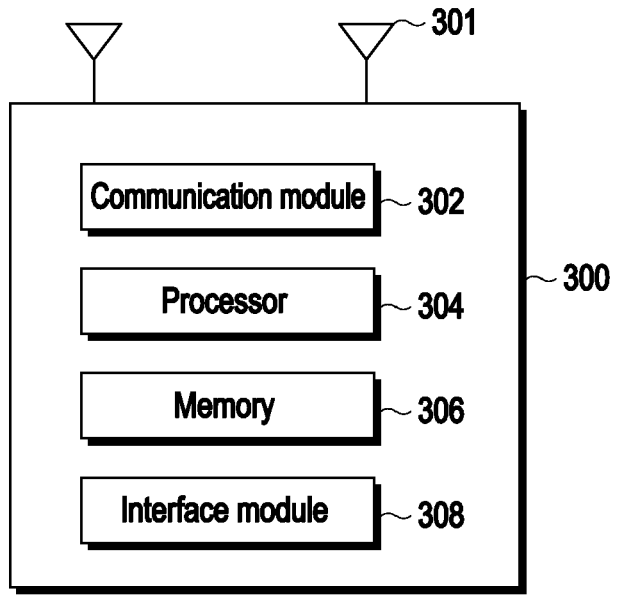
FIG. 3 is a block diagram illustrating the internal structure of an electronic device according to various embodiments.

FIG. 3 is a block diagram illustrating the internal structure of an electronic device according to various embodiments.

Referring to FIG. 3, an electronic device 300 (e.g., the electronic device 101), which is a communication device supporting a mobile hotspot function, may be, for example, the electronic device 205 illustrated in FIG. 2. The electronic device 300 may include a communication module 302 (e.g., the wireless communication module 192 of FIG. 1) including a physical (PHY) layer circuit that transmits and receives signals to and from an external electronic device, for example, a client device, using one or more antennas 301, and a medium access control (MAC) layer circuit.

The electronic device 300 may include a processor 304 (e.g., the processor 120 of FIG. 1), which may be implemented as one or more single-core processors or one or more multi-core processors, and memory 306 (e.g., the memory 130 of FIG. 1) storing instructions to operate the electronic device 300.

The electronic device 300 may include an interface module 308 (e.g., the interface 177 of FIG. 1) providing a wired interface and/or a wireless interface for communication with external components. At least some of the antenna 301, the communication module 302, or the interface module 308 may be implemented as at least some of the communication module 190 or the antenna module 198 of FIG. 1, for example.

The communications module 302 and processor 304 may process various radio control functions to communicate with one or more wireless networks according to one or more radio technologies. For example, the wireless technologies may include worldwide interoperability for microwave access (WiMax), Wi-Fi, global system for mobile communications (GSM), enhanced data rates for GSM (EDGE), GSM EDGE radio access network (GERAN), universal mobile telecommunication system (UMTS), UMTS terrestrial radio access network (UTRAN), $3^{rd}$ generation (3G), $4^{th}$ generation (4G), $5^{th}$ generation (5G), or beyond-5G, which has been already developed or will be developed in the future. In an embodiment, the communication module 302 may include a cellular communication module capable of accessing the Internet through a cellular BS and a WLAN communication module capable of accessing a client device in the mobile hotspot mode. Specifically, in an embodiment, the communication module 302 may include a WLAN communication module capable of simultaneously accessing the client device while accessing the Internet through an AP or a BS, in the mobile hotspot mode.

According to an embodiment of the disclosure, an electronic device (e.g., the electronic device 405) for providing information about an AP (e.g., the AP 415) in a wireless communication system may include a communication module (e.g., the communication module 302) and at least one processor (e.g., the processor 304) functionally connected to the communication module. The at least one processor may be configured to provide a tethering service to an external electronic device (e.g., the external electronic device 410) through the communication module in a mobile hotspot mode, search for at least one AP capable of replacing the tethering service for the external electronic device through the communication module, while providing the tethering service, and when the at least one AP is detected as a result of the search, transmit configuration information (e.g., the configuration information 405a) about the at least one AP for connecting the external electronic device to connect to the at least one AP to the external electronic device through the communication module.

According to an embodiment of the disclosure, the at least one processor may be configured to, when a received signal strength of the AP is equal to or greater than a specified threshold, and QoS information about the AP is suitable for servicing the external electronic device, determine to provide the configuration information about the AP to the external electronic device.

According to an embodiment of the disclosure, the at least one processor may be configured to, when the received signal strength of the AP is equal to or greater than the specified threshold, connect the electronic device to the AP and receive the QoS information about the AP from the AP through the communication module.

According to an embodiment of the disclosure, the at least one processor may be configured to, when the AP is capable of accessing the Internet and/or the external electronic device is connectable to the AP without an additional authentication procedure, determine to provide the configuration information about the AP to the external electronic device.

According to an embodiment of the disclosure, the at least one processor may be configured to, when a battery level of the electronic device is less than a first threshold, a radio channel quality of the electronic device is less than a second threshold, and/or a remaining amount of data available for the electronic device to provide the tethering service is less than a third threshold, deactivate the mobile hotspot mode.

According to an embodiment of the disclosure, the configuration information may be transmitted to the external electronic device through a DPP configuration response frame of a Wi-Fi DPP (e.g., operation 935).

According to an embodiment of the disclosure, the at least one processor may be configured to, when there is no connection for the tethering service for a specified time or a status field indicating successful connection to the AP is received from the external electronic device after transmitting the configuration information, deactivate the mobile hotspot mode.

According to an embodiment of the disclosure, the at least one processor may be configured to monitor connectivity of the AP after deactivating the mobile hotspot mode, and when a received signal strength of the AP is less than a first threshold, QoS information about the AP is not suitable for servicing the external electronic device, and/or a hotspot request for requesting the tethering service is received from the external electronic device, activate the mobile hotspot mode.

According to an embodiment of the disclosure, the at least one processor may be configured to, when the external electronic device is not connected to the tethering service of the mobile hotspot mode for a specified time after activating the mobile hotspot mode, deactivate the mobile hot spot mode.

According to an embodiment of the disclosure, the hotspot request may be received from the external electronic device through a DPP presence announcement frame of a Wi-Fi DPP (e.g., operation 911 or operation 917).

Figure 4A:
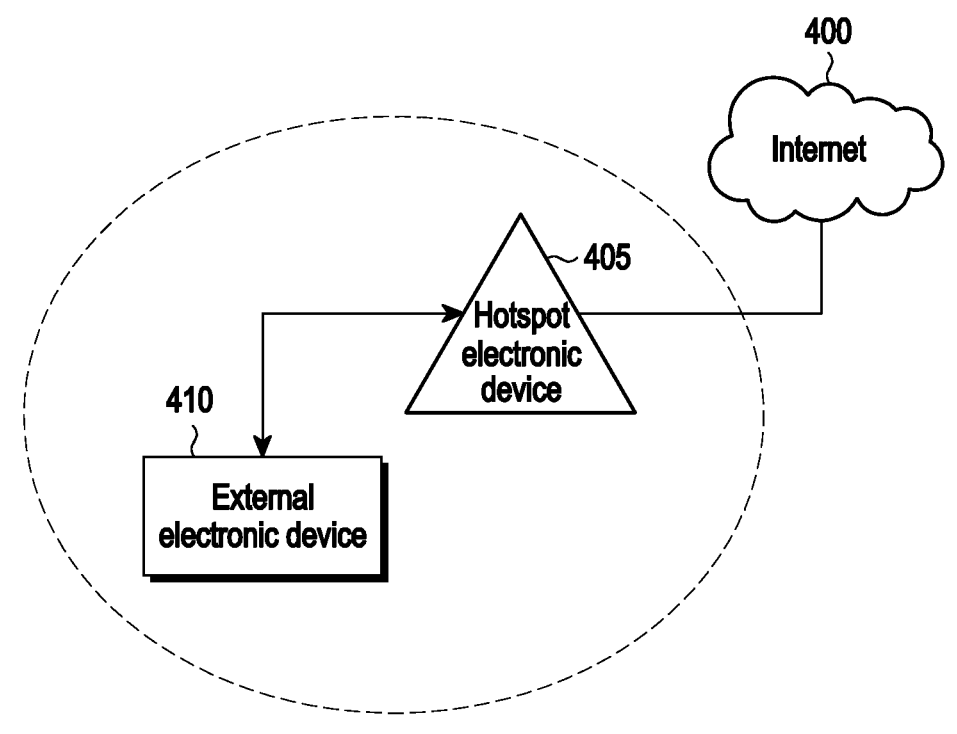
FIGS. 4A and 4B are diagrams illustrating an operation of providing information about an access point (AP) by an electronic device according to an embodiment of the disclosure.
Figure 4B:
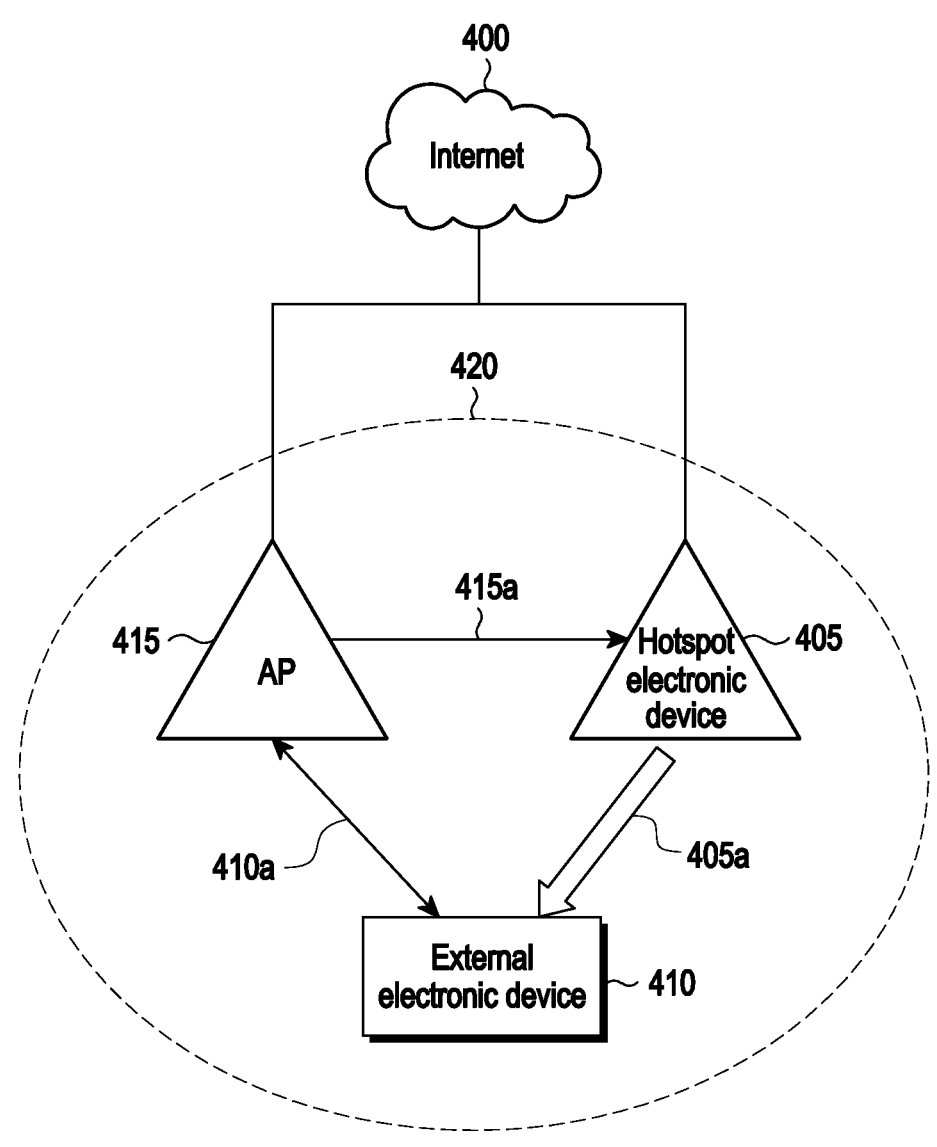

FIGS. 4A and 4B are diagrams illustrating an operation of providing information about an AP by an electronic device according to an embodiment of the disclosure.

Referring to FIG. 4A, an electronic device 405 (e.g., configurable like the electronic device 101 of FIG. 1) may provide a tethering service to an external electronic device 410 (e.g., configurable like the electronic device 101 of FIG. 1) through a mobile hotspot. The electronic device 405 may be referred to as a hotspot electronic device. In an embodiment, when a signal from a neighboring AP detectable by the external electronic device 410 becomes weak or when there is no neighboring AP, the electronic device 405 may activate a mobile hotspot mode. The electronic device 405 may be connected to the Internet 400 through Wi-Fi or a cellular network and share the connection to the Internet 400 with the external electronic device 410 through a tethering service. In an embodiment, the electronic device 405 may be connected to the external electronic device 410 through Wi-Fi and provide the tethering service to the external electronic device 410. While providing the tethering service, the electronic device 405 may continuously search for a neighboring AP. When the electronic device 405 determines that it is not capable of providing the mobile hotspot mode any longer, when the electronic device 405 determines not to provide the mobile hotspot mode for other reasons, or for the purpose of providing another more stable Internet service to the external electronic device 410, the electronic device 405 may induce the external electronic device 410 to perform Wi-Fi handover to another AP, according to an embodiment, the external electronic device 410 may require information about another AP to continuously maintain the Internet connection without intervention of the electronic device 405 providing the hotspot mode.

Referring to FIG. 4B, the electronic device 405 may continuously search for a neighboring AP, while providing the tethering service to the external electronic device 410. When the electronic device 405 is located within a coverage area 420 of an AP 415, the electronic device 405 may detect a signal 415a of the AP 415 as a result of the AP search. When the AP 415 is discovered, the electronic device 405 may provide the external electronic device 410 with configuration information 405a required for connection to the AP 415. Embodiments of a specific procedure of providing the configuration information 405a to the external electronic device 410 will be further described below. The external electronic device 410 may attempt and establish a connection 410a with the AP 415 using the configuration information 405a.

In an embodiment, a Wi-Fi DPP may be used to transmit the configuration information 405a of the AP 415 to the external electronic device 410. The electronic device 405 may serve as a DPP configurator and perform DPP provisioning with the external electronic device 410. The configuration information 405a required for connection to the discovered AP 415 may be transmitted to the external electronic device 410 through DPP provisioning. In an embodiment, the configuration information 405a required for connection to the AP 415 may include credential information about the AP 415.

In an embodiment, the external electronic device 410 may serve as a DPP enrollee and receive the configuration information about the AP 415 by the DPP. When receiving the configuration information about the AP 415, the external electronic device 410 may attempt to connect to the AP 415 using the configuration information. When the external electronic device 410 successfully connects to the AP 415 and performs Wi-Fi handover to the AP 415, the external electronic device 410 may terminate the connection to the electronic device 405 and stably maintain the Internet connection through the AP 415.

The DPP proposed based on the Wi-Fi standard by the WFA will be described below.

Providing a process of easily and securely connecting a Wi-Fi device to a network may be essential for the continuous growth and expansion of the Wi-Fi technology. Particularly, providing a process of connecting a Wi-Fi device to a network in a simple and safe manner may be more essential in markets such as smart homes and Internet of Things (IoT) in which many Wi-Fi devices have no user interface or if any, a limited user interface.

Network information and security information may be provided to a Wi-Fi device to configure a network connection of the Wi-Fi device. Therefore, adding a Wi-Fi device that has no user interface or a limited user interface to the network is not only cumbersome but also is performed in a different manner depending on the manufacturer of the Wi-Fi device.

The DPP technology may provide a Wi-Fi device configuration method that may connect a Wi-Fi device to a Wi-Fi network in a simple and efficient manner. Particularly, the DPP technology may support a Wi-Fi device having no user interface or a limited user interface to simply and efficiently connect to a Wi-Fi network.

The DPP technology may simplify the configuration of a Wi-Fi device and directly connect the Wi-Fi device to a Wi-Fi network in a relatively easy way, such as scanning a product quick response (QR) code with a smartphone, based on a standardized mechanism. Particularly, the DPP technology may, for example, simplify network setup and client device provisioning, while providing improved user experience, enhanced security, and/or IoT device provisioning support.

In the DPP technology, for example, a network manager may set up an AP and also manage network access of other client devices, for example, other client Wi-Fi devices by using a reliable device, for example, a reliable electronic device such as a smartphone in a network such as a home or an office. In other words, the DPP may be a protocol that supports a smooth user experience, while maintaining a secure network connection using a strong cryptographic principle.

Figure 5:
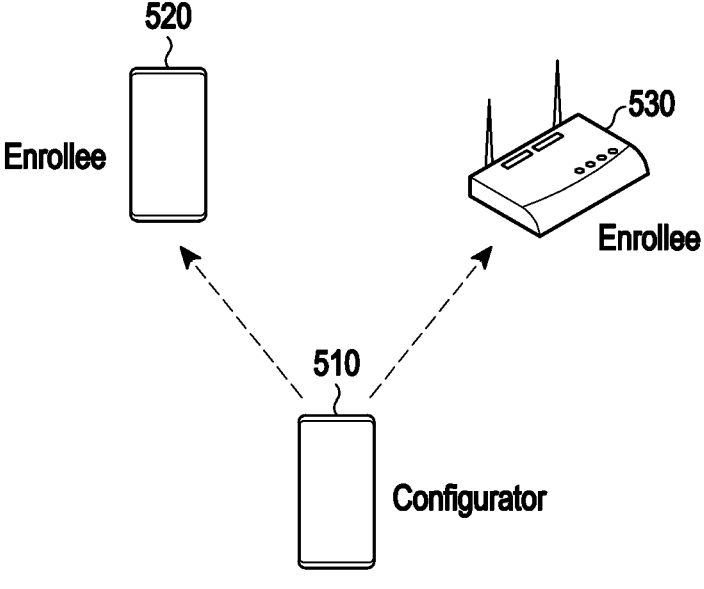
FIG. 5 is a diagram illustrating an exemplary architecture of a device provisioning protocol (DPP) network according to an embodiment of the disclosure.

FIG. 5 is a diagram illustrating an exemplary architecture of a DPP network according to an embodiment of the disclosure.

Referring to FIG. 5, the DPP network may include devices implementing the DPP (hereinafter, referred to as "DPP devices"), for example, a first DPP device 510, a second DPP device 520, and a third DPP device 530. The DPP architecture may define device roles during bootstrapping, authentication, provisioning (or configuration), and connectivity (or introduction), and the device roles may include two types, that is, configurator and enrollee or initiator and responder. In the illustrated example, the first DPP device 510 may operate as a configurator, and the second and third DPP devices 520 and 530 may operate as enrollees. Each of the first, second, and third DPP devices 510, 520, and 530 may operate as an initiator or a responder.

An initiator refers to a DPP device that initiates a DPP authentication protocol, and either a configurator or an enrollee may be an initiator. In an embodiment, a responder refers to a DPP device that responds to the initiation of the DPP authentication protocol by an initiator, and either a configurator or an enrollee may be a responder.

In a DPP network, a configurator may be a logical entity having capabilities to enroll and provision a device for device-to-device (D2D) communication or infrastructure communication.

The configurator may support setup of an enrollee. The configurator and the enrollee may participate in a DPP bootstrapping protocol, a DPP authentication protocol, and a DPP configuration protocol. The configurator or the enrollee may play the role of an initiator in the DPP bootstrapping protocol or the DPP authentication protocol. However, only the enrollee may initiate the DPP configuration protocol and the DPP introduction protocol.

Both of the configurator and the enrollee may have bootstrapping keys from the same elliptic curve before initiating the DPP authentication protocol, and if necessary (and depending on a bootstrapping method), the bootstrapping keys may be generated upon request. For example, the elliptic curve may be an algorithm used to generate an encryption key, and the method of generating an encryption key may not be limited to an elliptic curve. The DPP authentication protocol may request an initiator to obtain the bootstrapping key of a responder as a part of a previous bootstrapping mechanism. In some embodiments, each of the configurator and the enrollee may obtain the bootstrapping key of the other to provide mutual authentication in the DPP authentication protocol. After the authentication is completed, the configurator may provision the enrollee for D2D communication or infrastructure communication. As a part of this provisioning, the configurator may enable the enrollee to establish security associations with other external electronic devices in the DPP network.

A configurator and an enrollee will be described below in detail.

In the DPP network, a specific DPP device, for example, a main DPP device may be designated as a configurator. The configurator as a central configuration point may provision all DPP devices included in the DPP network including an AP. Any one of various DPP devices included in the DPP network may become the configurator. In an embodiment, the electronic device 405 operating in the mobile hotspot mode in FIG. 4B may operate as a configurator to provide configuration information about the AP 415.

A DPP device that a network manager of the DPP network wants to connect to the DPP network may be referred to as an enrollee. A DPP device added to the DPP network, for example, an AP, a smart home appliance, a computer, a printer, or a TV may be an enrollee, and all DPP devices capable of implementing a Wi-Fi function except the configurator may be enrollees. One DPP device may become an enrollee through an enrollment process. In an embodiment, the electronic device 410 using the tethering service in FIG. 4B may operate as an enrollee and receive the configuration information about the AP 405.

Figure 6:
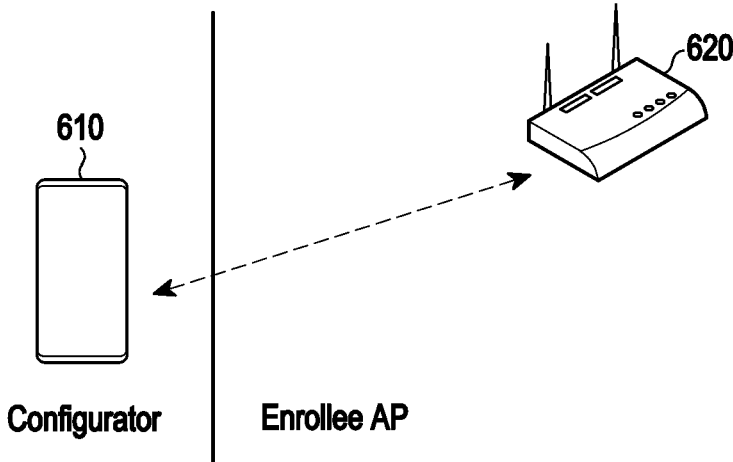
FIG. 6 is a diagram illustrating an exemplary operation of establishing a network in a DPP network according to various embodiments.

FIG. 6 is a diagram illustrating an exemplary operation of establishing a network in a DPP network according to various embodiments.

Referring to FIG. 6, according to an embodiment, a configurator 610 may provision an enrollee AP 620 based on the DPP. According to an embodiment, the configurator 610 may provision client enrollees (not shown in FIG. 6) which are other enrollees, and enable the enrollees to discover, select, and connect to a DPP network. In an initial enrollment process, a network manager of the DPP network may configure a mobile device (e.g., a smartphone) as the configurator 610 and then configure the AP 620 considered to be an enrollee through the configurator 610. In an example, the AP configuration may be performed prior to network connection, and the DPP network may be established through the AP configuration.

Figure 7:
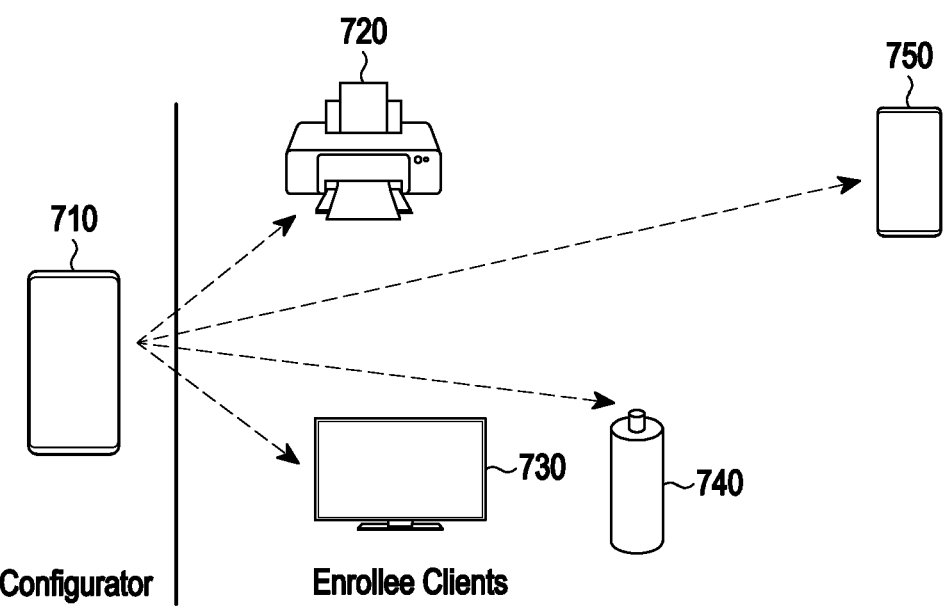
FIG. 7 is a diagram illustrating an exemplary enrollment process in a DPP network according to various embodiments.

FIG. 7 is a diagram illustrating an exemplary enrollment process in a DPP network according to various embodiments.

Referring to FIG. 7, after the DPP network is established, the manager of the DPP network may initiate an enrollment process for enrolling DPP devices. In the enrollment process, each of client enrollee #1 720, client enrollee #2 730, client enrollee #3 740, and client enrollee #4 750 may obtain a configuration for connection to the DPP network based on information provisioned by a configurator 710. The configurator 710 may generate configuration information including credential information about any one client enrollee (e.g., enrollee #1 720), and the client enrollee #1 720 may establish a connection to the DPP network according to the configuration information. At least one other client enrollees 730, 740, and 750 may also be configured by the configurator 710.

In an embodiment, configuration information may include credential information required to join a peer-to-peer (P2P) group. In an embodiment, the credential information may include connector information related to the external electronic device 410, a C-sign-key signed by the electronic device 405 for use in verifying the external electronic device 410, a legacy preshared key (PSK), or a passphrase according to the value of an authentication and key management (AKM) parameter.

Figure 8:
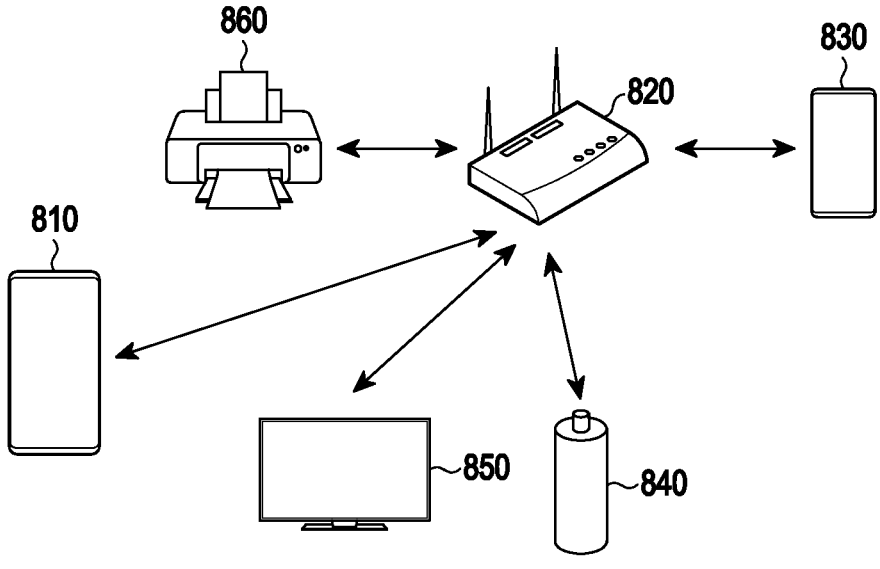
FIG. 8 is a diagram illustrating an exemplary network connection operation in a DPP network according to various embodiments.

FIG. 8 is a diagram illustrating an exemplary network connection operation in a DPP network according to various embodiments.

Referring to FIG. 8, DPP devices may be enrolled in the DPP network. Among the DPP devices, a client enrollee may discover the DPP network through an AP 820 based on a configuration for connection to the DPP network, obtained in an enrollment process, and connect to the discovered DPP network. In an embodiment, the AP 820 may be configured by a configurator 830, and enrollee #1 810, enrollee #2 840, enrollee #3 850, and enrollee #4 860 may discover the DPP network through the AP 820 and connect to the discovered DPP network.

The WFA provides Wi-Fi Easy Connect to make an operation of adding devices to a Wi-Fi network simpler and more efficient. Wi-Fi Easy Connect supports a bootstrapping mechanism, and the bootstrapping mechanism is a mechanism that allows safe addition of a configurator and an enrollee to a Wi-Fi network while minimizing a user's interaction for each Wi-Fi device. Wi-Fi Easy Connect may use an enrollee QR code to support the bootstrapping mechanism. In an embodiment, the QR code may include various pieces of information such as a secure key or a unique identifier (ID) of a Wi-Fi device. The QR code may be easily recognized by a Wi-Fi device equipped with a QR code scanning function and relieve a user of inconvenience involved in directly inputting information for Wi-Fi device authentication. Alternatively, the QR code may also prevent issues that may occur due to data input errors.

An exemplary provisioning operation using a QR code and a configurator in a Wi-Fi Easy Connect network will be described.

(1) The configurator may scan the QR code of an enrollee using a camera that the configurator has. For example, the QR code may be provided in the form of a sticker or card attached to the enrollee or displayed on a screen of the enrollee.

(2) The configurator may automatically search for a secure Wi-Fi communication link with the enrollee by reading and decoding the QR code, and establish the secure Wi-Fi communication link with the enrollee based on a result of the search.

(3) The configurator may configure Wi-Fi network information for the enrollee by using a secure channel.

(4) When the configuration of the Wi-Fi network information for the enrollee is completed, the enrollee may discover a Wi-Fi network without user intervention by using the Wi-Fi network information provided by the configurator, select a specific Wi-Fi network based on a result of the discovery, and connect to the selected Wi-Fi network.

When the configurator does not have a QR code recognition function or the enrollee does not have a QR code display function in the Wi-Fi Easy Connect network, the user may directly input a given string in relation to the enrollee, thereby enabling establishment of a Wi-Fi communication link between the configurator and the enrollee.

The Wi-Fi Easy Connect technology is designed to be flexible enough to provision devices in various manners, and may support a configurator or an enrollee to initiate a provisioning operation. As noted from the above-described example of the provisioning operation, a device operating as a configurator, for example, a smartphone may scan the QR code of a device operating as an enrollee, for example, an IoT device, and include the QR code of the IoT device in Wi-Fi network information to be provisioned.

In an embodiment, it may be possible for the configurator to provide the QR code of the enrollee for Wi-Fi configuration provisioning. For example, the configurator may provide a QR code to the enrollee, for example, a hotel room TV in a Wi-Fi network of a hotel. Then, a customer may scan the QR code displayed on the hotel room TV using a smartphone to use the Wi-Fi network, and accordingly, the above-described provisioning operation may be performed. That is, the smartphone of the customer may be on-boarded to the Wi-Fi network of the hotel.

The provisioning process proposed in the DPP may include a total of four operations, that is, a bootstrapping operation, an authentication operation, a configuration operation, and an access operation. In an embodiment, the access operation may also be referred to as a peer discovery operation. In an embodiment, one electronic device may operate as a configurator, and at least one external electronic device may operate as an enrollee in the three operations of bootstrapping, authentication, and configuration. In an embodiment, the configurator may perform an operation of configuring electronic devices connected to the DPP network, as described above.

In an embodiment, an enrollee AP may perform an operation of providing access to a network, as described above. In an embodiment, an enrollee may be a client enrollee or an AP, and when a network configuration is completed, the enrollee may access the network by connecting to the AP or provide access to the network by acting as an AP.

The bootstrapping operation, the authentication operation, the configuration operation, and the access operation will be described below.

A description of the bootstrapping operation will be given below.

In the bootstrapping operation, DPP devices may exchange public bootstrapping keys to establish a secure provisioning connection. Specifically, IDs may be assigned to the DPP devices, and the IDs assigned to the DPP devices may include QR codes or (printed or digital) user-readable strings in the form of a public key and a private key. In the bootstrapping operation, a configurator and an enrollee may establish a reliable relationship, perform mutual authentication, and establish a secure connection based on a result of the mutual authentication.

In an embodiment, public bootstrapping keys may be exchanged in the bootstrapping operation, as described above. The public bootstrapping keys may be transmitted uni-directionally or bi-directionally depending on whether mutual authentication between the configurator and the enrollee is required. In the bootstrapping operation, the public bootstrapping keys may be exchanged based on various methods such as a QR code scheme, a Bluetooth scheme, a Bluetooth low energy (BLE) scheme, a near field communication (NFC) scheme, a public key exchange (PKEX) scheme, and a cloud scheme.

After the public bootstrapping keys are exchanged as such, a connection may be established between the configurator and the enrollee. In an embodiment, the public bootstrapping keys may be different from a secure credential that the enrollee receives in the configuration operation following the bootstrapping operation. In an embodiment, bootstrapping information may be used in the authentication operation and the configuration operation after the bootstrapping operation and include a small list of global operating classes/channel pairs, and a MAC address. In an embodiment, the small list of global operating channel classes/channel pairs may ideally include only one channel.

The authentication operation and the configuration operation will be described below.

In the authentication operation, the DPP devices may establish a reliable and secure channel using the bootstrapping keys by the DPP authentication protocol, and in the configuration operation, the configurator may provision the enrollee through the secure channel established during the DPP authentication by performing the DPP configuration protocol. This will be described below in detail.

When the bootstrapping operation is completed, the configurator and the enrollee may establish a secure Wi-Fi connection using the DPP authentication protocol. In the authentication and configuration operations, the configurator, which is an initiator, may request authentication from the enrollee, which is a responder, based on channel information obtained through the bootstrapping operation. For example, the configurator may request authentication by transmitting a DPP authentication request frame to the responder. In an embodiment, the enrollee may respond to the authentication request of the configurator, while waiting in the corresponding channel based on the channel information obtained through the bootstrapping operation. For example, the enrollee may respond to the authentication request by transmitting a DPP authentication response frame to the configurator.

As the authentication operation is completed as described above, a secure connection may be established between the configurator and the enrollee. After the secure connection is established, the enrollee may start a transaction to obtain a configuration from the configurator. In an embodiment, the responder may transmit a DPP configuration request frame to the configurator, and the configurator may transmit a DDP configuration response frame to the responder in response to the DDP configuration request frame. The responder may verify the configuration information and network information obtained through the DPP configuration protocol and transmit a result to the configurator. As the configuration operation is completed, the enrollee may operate as an AP or search for a target AP and be securely connected to the detected target AP.

Encoded configuration information transmitted and received in the configuration operation may include, for example, at least one of the following DPP Configuration Objects.

(1) Wi-Fi Technology Object

The Wi-Fi technology object may identify the Wi-Fi technology of a policy to be provisioned in the enrollee, and indicate a connection type such as AP infrastructure connection. For example, the Wi-Fi technology object may indicate a Wi-Fi technology to be used in the DPP authentication operation and the DPP configuration operation.

(2) Discovery Object

The discovery object may include, for example, operation or discovery information such as an SSID, an operating channel, and an operating band.

(3) Credential Object

The credential object may include credential information provisioned in the enrollee to obtain secure network access.

In the DPP configuration operation, the configuration information and the network information may be transmitted from the configurator to the enrollee. In an embodiment, credential information in the configuration information may include connector information. The connector information is information provisioned in the enrollee, and may be used for a pair of enrollees to establish a security association using the DPP network introduction protocol.

In an embodiment, the connector information is a credential signed by the configurator, and may be used for a client enrollee to connect to an enrollee AP. In an embodiment, the configurator may have, for example, a signing key pair (c-sign-key and C-sign-key) wherein the c-sign-key may be used for the configurator to sign the connector information, and the C-sign-key may be used for provisioned DPP devices to verify connector information about other DPP devices signed by the same configurator.

Connector information about each enrollee may include a public key, a network role, and group attribute information and be signed by the configurator. The public key may provide the ID of the enrollee. The network role may indicate whether the enrollee is to be enrolled as an enrollee STA or an enrollee AP. The group attribute information may be used to determine whether the enrollee is capable of establishing a network connection. A connector signature may prove that connector contents were created by the configurator. Since the connector information includes a public key rather than a passphrase, it may be different for each Wi-Fi device, for example, each enrollee. For example, the enrollee may not access the network using connector information about another enrollee, and when the enrollee corresponding to the connector information belongs to a specific AP, this may mean that another AP is not capable of disguising itself as the specific AP.

In an embodiment, the client enrollee may search for the enrollee AP based on the network information. The client enrollee may perform an authentication operation based on connector information and establish a network connection based on the network introduction (NI) protocol. The advantage of using connector information is that each enrollee connected to an AP may have a unique secure credential.

Figure 9:
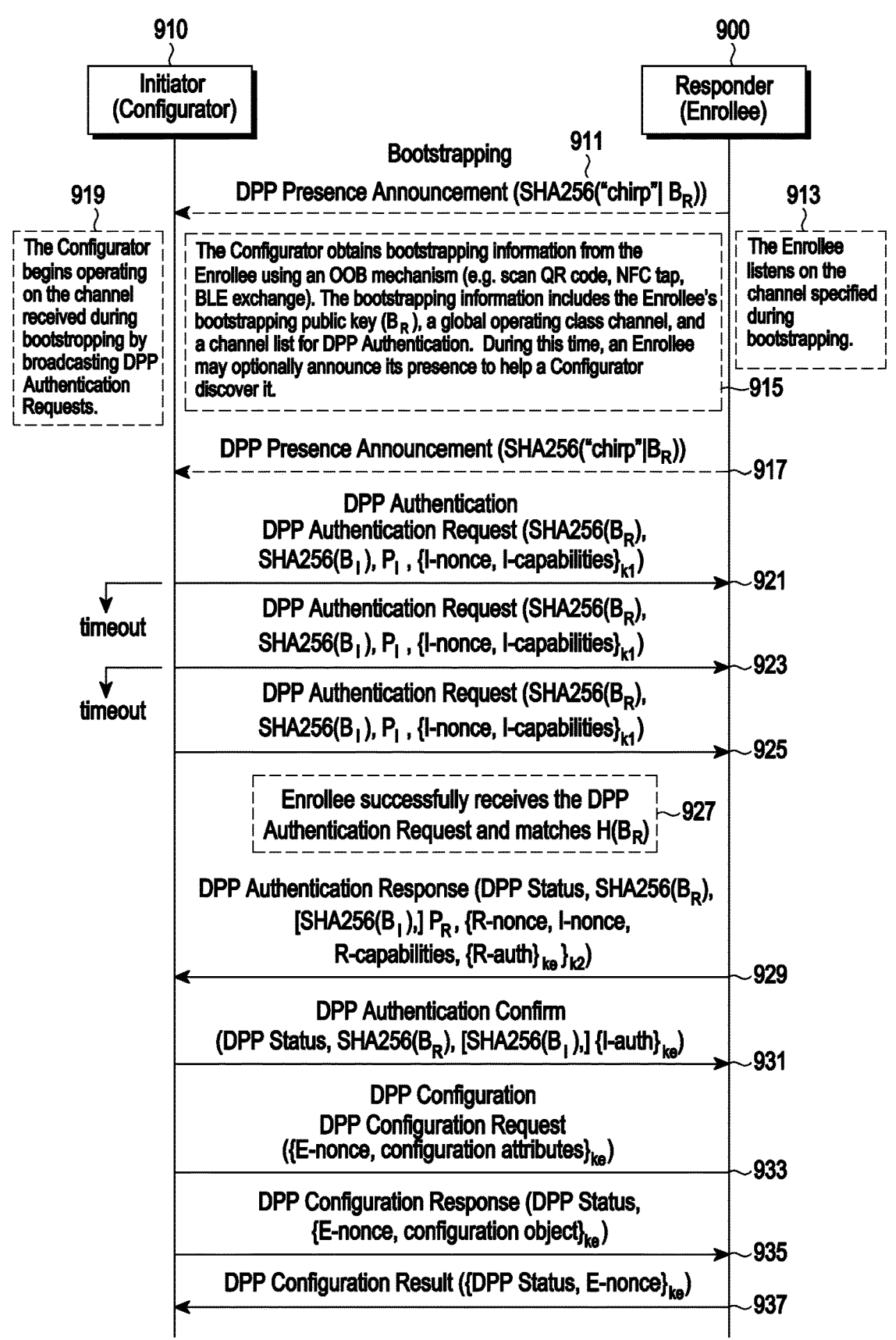
FIG. 9 is a diagram illustrating an exemplary provisioning process in a DPP network according to various embodiments.

FIG. 9 is a diagram illustrating an exemplary provisioning process in a DPP network according to various embodiments. Herein, a signal flow between an enrollee 900 operating as a responder and a configurator 910 operating as an initiator is shown. In an example, the enrollee 900 may be the external electronic device 410 of FIG. 4B, and the configurator 910 may be the electronic device 405 of FIG. 4B. In the following description, operations 911 to 917 may refer to a DPP bootstrapping procedure, operations 921 to 931 may refer to a DPP authentication procedure, and operations 933 to 937 may refer to a DPP configuration procedure. The DPP bootstrapping procedure may be performed by the signal flow of operations 911 and 917 or by an external means such as use of a QR code as described above. When an external means such as a QR code is used, the signal flow of operations 911 and 917 may be omitted.

Referring to FIG. 9, in operation 911, the enrollee 900 may transmit a DPP presence announcement frame. In an embodiment, the DPP presence announcement frame may be used to signal to the configurator 910 that the enrollee 900 is ready to participate in a DPP exchange, and include a hash including a public bootstrapping key of the configurator 900. In an embodiment, a hash for the DPP existence announcement frame to prevent leakage of the hash of a public key of an unprovisioned device may be SHA256 ("chirp"|$B_R$). $B_R$ may represent the public bootstrapping key of the enrollee 900.

In operation 913, the enrollee 900 may perform a listening operation on a specified channel during the DPP bootstrapping operation. In operation 915, the configurator 910 may obtain bootstrapping information from the enrollee 900 using an out-of-band (OOB) mechanism, for example, a QR code scan, an NFC tap, or a BLE exchange. In an embodiment, the bootstrapping information may include the public bootstrapping key $B_R$ of the enrollee 900 for DPP authentication, a global operating class channel, and/or a channel list. In an embodiment, during the DPP bootstrapping operation, the enrollee 900 may transmit the DPP presence announcement frame to, in some embodiments, advertise the existence of the enrollee 900 for assisting the configurator 910 in discovering the enrollee 900 in operation 917.

In operation 919, the configurator 910 may determine to start an operation on a channel based on channel information received during the bootstrapping. Accordingly, in operations 921, 923, and 925, the configurator 910 may repeatedly broadcast a DPP authentication request frame. In an embodiment, the DPP authentication request frame may include SHA256($B_R$), SHA256($B_I$), $P_I$, and/or {I-nonce, I-capabilities}$_{k1}$. SHA256($B_R$) may represent an SHA256 hash for $B_R$, $B_I$ may represent the public bootstrapping key of the configurator 910, SHA256($B_I$) may represent an SHA256 hash for $B_I$, $P_I$ may represent the public bootstrapping key of the configurator 910, I-nonce may represent an initiator nonce attribute, I-capabilities may represent an initiator capabilities attribute, and k1 may represent a first intermediate key.

When the configurator 910 repeatedly broadcasts the DPP authentication request frame (e.g., 921 and 923), and the enrollee 900 successfully receives at least one DPP authentication request frame (e.g., 925), the DPP presence announcement may end, and the procedure may proceed to the authentication and configuration procedures. In operation 927, to proceed with the authentication procedure, the enrollee 900 may identify that a hash function value, H($B_R$) for $B_R$ matches the SHA256 hash in the received DPP authentication request frame. In operation 929, the enrollee 900 may transmit a DPP authentication response frame to the configurator 910 in response to the DPP authentication request frame. In an embodiment, the DPP authentication response frame may include a DPP status field, SHA256 ($B_R$), [SHA256($B_I$)], $P_R$, and/or {R-nonce, I-nonce, R-capabilities, {R-auth}$_{ke}$}$_{k2}$. $P_R$ may represent the public protocol key of the enrollee 900, R-nonce may represent a responder nonce attribute, R-capabilities may represent a responder capabilities attribute, k2 may represent a second intermediate key, and may, in some embodiments represent present value. That is, [SHA256($B_I$)] may be included in the DPP authentication response frame, when a specific condition is satisfied or selectively.

In an embodiment, the DPP status field in the DPP authentication response frame may indicate one of the statuses listed in Table 1 below.

TABLE 1

| Status or Error | Value | Meaning |
| --- | --- | --- |
| STATUS_OK | 0 | No errors or abnormal behavior |
| STATUS_NOT_COMPATIBLE | 1 | The DPP Initiator and Responder have incompatible capabilities |
| STATUS_AUTH_FAILURE | 2 | Authentication failed |
| STATUS_BAD_CODE | 3 | The code used in PKEX is bad |
| STATUS_BAD_GROUP | 4 | An unsupported group was offered |
| STATUS_CONFIGURE_FAILURE | 5 | configurator refused to configure Enrollee |
| STATUS_RESPONSE_PENDING | 6 | Responder will reply later |
| STATUS_INVALID_CONNECTOR | 7 | Received Connector is invalid for some reason. The sending device needs to be reconfigured. |
| STATUS_NO_MATCH | 8 | Received Connector is verified and valid but no matching Connector could be found. The receiving device needs to be reconfigured. |
| STATUS_CONFIG_REJECTED | 9 | Enrollee rejected the configuration. |
| STATUS_NO_AP | 10 | Enrollee failed to discover an access point. |
| STATUS_CONFIGURE_PENDING | 11 | Configuration response is not ready yet. The enrollee needs to request again. |
| STATUS_CSR_NEEDED | 12 | Configuration requires a Certificate Signing Request. The enrollee needs to request again. |
| STATUS_CSR_BAD | 13 | The Certificate Signing Request was invalid. |
| STATUS_NEW_KEY_NEEDED | 14 | The Enrollee needs to generate a new Protocol key. |

In operation 931, the configurator 910 which has received the DPP authentication response frame from the enrollee 900 may transmit a DPP authentication confirm frame to the enrollee 900. In an embodiment, the DPP authentication confirm frame may include a DPP status field, SHA256(B$_R$), [SHA256(B$_I$)], and {I-auth}$_{ke}$. I-auth may represent an authenticating tag of the configurator 910, and ke may represent an encryption key.

In operation 933, the enrollee 900 which has received the DPP authentication confirmation frame from the configurator 910 may transmit a DPP configuration request frame to the configurator 910. In an embodiment, the DPP configuration request frame may include {E-nonce, configuration attributes}$_{ke}$. In an embodiment, E-nonce may represent an E-nonce attribute, and configuration attributes may represent a DPP configuration request object attribute. In operation 935, the configurator 910 may transmit a DPP configuration response frame to the enrollee 900 in response to the DPP configuration request frame. In an embodiment, the DPP configuration response frame may include a DPP status field and {E-nonce, configuration object}$_{ke}$. Configuration objects included in the DPP configuration response frame may include a Wi-Fi technology object, a discovery object, and/or a credential object in an embodiment.

In an embodiment, when a DPP protocol version is 2 or higher, the configurator 910 may include a sendConnStatus attribute in the DPP configuration response frame transmitted in operation 935 to request the enrollee 910 to provide a feedback for a configuration attempt applied to a configuration object successfully received by the DPP. When a configuration based on the configuration object is successfully applied, the enrollee 900 may search for an AP using the configuration object and attempt a connection to the AP. When sendConnStatus is included in the received DPP configuration response frame, the enrollee 900 may transmit a DPP configuration result frame including a DPP status field indicating a status of the connection attempt and an E-nonce in operation 937.

In an embodiment, the DPP status field in the DPP configuration result frame may indicate one of the statuses listed in Table 2 below.

TABLE 2

| Connection Attempt Result | DPP Status |
| --- | --- |
| Enrollee successfully associated to the AP and has network access | STATUS_OK |
| Enrollee discovered the AP and failed to connect to the network. | STATUS_AUTH_FAILURE |
| Enrollee received an invalid connector during network introduction. | STATUS_INVALID_CONNECTOR |
| Received AP Connector is verified and valid but no matching Connector could be found by Enrollee. | STATUS_NO_MATCH |
| Enrollee failed to discover an access point. | STATUS_NO_AP |

A DPP access operation in the provisioning process will be described below.

The network introduction protocol is used to allow a client enrollee to safely connect to an enrollee AP by using connector information in credential information provided by the configurator. The DPP access operation based on the network introduction protocol is performed as follows.

(1) Each of client enrollees and an AP enrollee may identify whether their connector information has been signed by the configurator.

(2) Each of the client enrollees may identify that its role is compatible and establish communication with the enrollee AP.

(3) The client enrollees may identify whether group attributes match.

(4) Each of the enrollee AP and the client enrollees may derive a pairwise master key (PMK) based on a public connector key.

(5) Connections may be established between the enrollee AP and the client enrollees based on the derived PMK.

Figure 10:
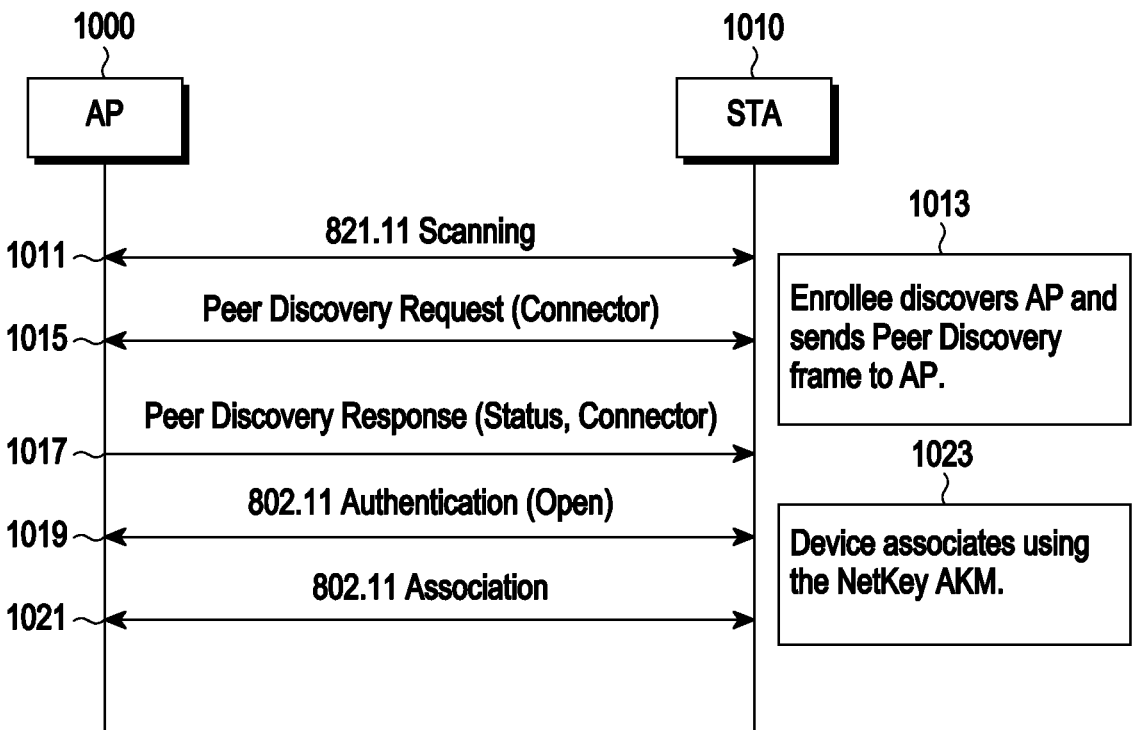
FIG. 10 is a signal flow diagram illustrating a network access operation using connector information according to various embodiments.

FIG. 10 is a signal flow diagram illustrating a network access operation using connector information according to various embodiments. Herein, an AP 1000 may be an enrollee AP (e.g., the AP 415 of FIG. 4B), and an STA 1010 may be a client enrollee (e.g., the external electronic device 410 of FIG. 4B).

Referring to FIG. 10, the STA 1010 may perform a Wi-Fi scanning operation (operation 1011). For example, the Wi-Fi scanning operation may be performed based on the IEEE 802.11 standard. The STA 1010 may discover the AP 1000 according to the Wi-Fi scanning operation (operation 1013), and transmit a peer discovery request frame including connector information to the AP 1000 (operation 1015). In an embodiment, the connector information included in the peer discovery request frame may have been received from a configurator (e.g., the electronic device 405 of FIG. 4B) through the DPP configuration response frame of FIG. 9.

The AP 1000 may receive the peer discovery request frame from the STA 1010 and transmit a peer discovery response frame to the STA 1010 in response to the peer discovery request frame (operation 1017). In an embodiment, the peer discovery response frame may include a DPP status field and connector information. When receiving the peer discovery response frame from the AP 1000, the STA 1010 may perform an authentication operation with the AP 1000 (operation 1019). When the authentication operation is successfully completed, the STA 1010 may perform an association operation with the AP 1000 (operation 1021). The STA 1010 may associate with the AP 1000 using a network key, AKM (operation 1023).

Figure 11:
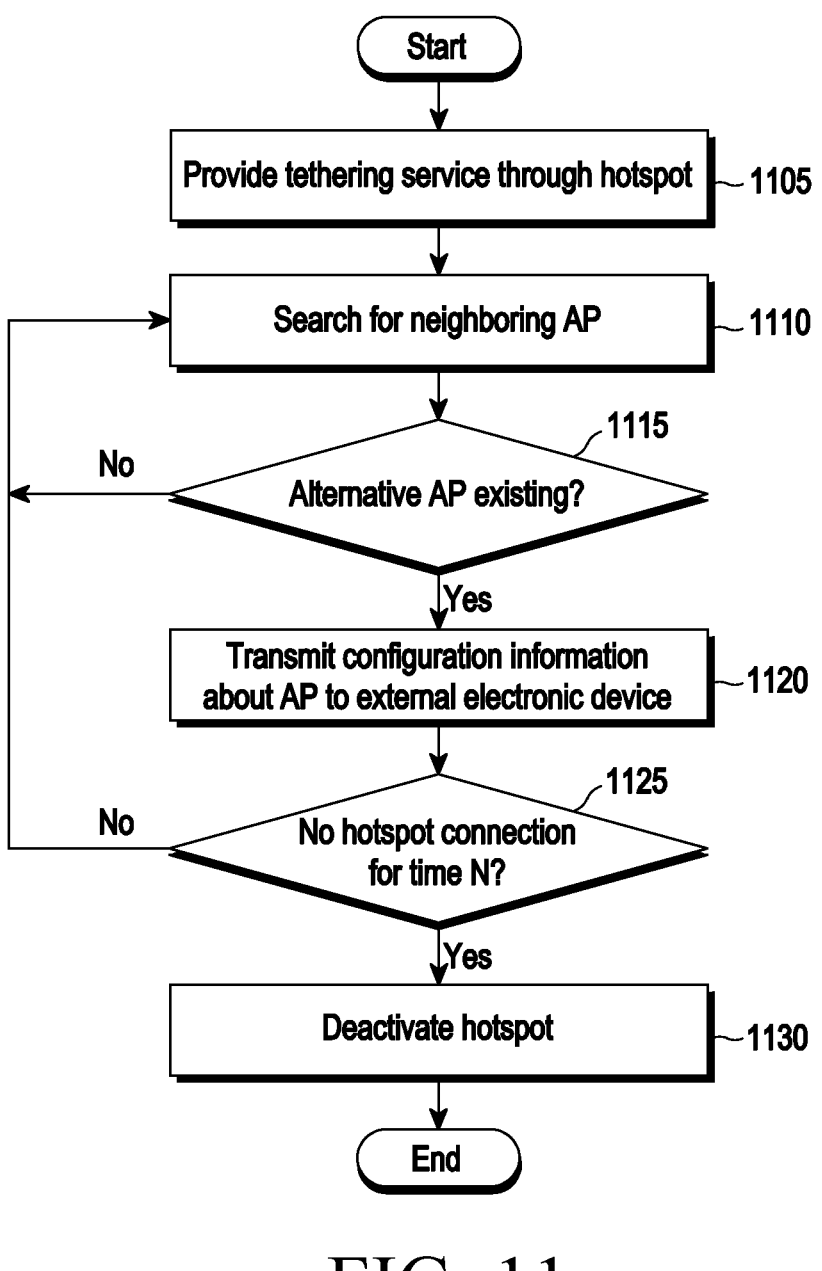
FIG. 11 is a flowchart illustrating a procedure of transmitting information about an access point (AP) according to various embodiments of the disclosure.

FIG. 11 is a flowchart illustrating a procedure of transmitting information about an AP according to various embodiments of the disclosure. The procedure of the illustrated flowchart may be performed, for example, by the processor 120 included in the electronic device 101 of FIG. 1.

Referring to FIG. 11, in operation 1105, the processor 120 may activate a mobile hotspot mode and provide a tethering service to an external electronic device (e.g., the electronic device 410 of FIG. 4B) in the mobile hotspot mode. The processor 120 may have an Internet connection through a cellular network or Wi-Fi and share the Internet connection with the external electronic device 410 through the tethering service. In operation 1110, the processor 120 may search for a neighboring AP and detect at least one AP (e.g., the AP 415 of FIG. 4B). For example, the processor 120 may scan a signal from the AP 415, and when the received signal strength of the signal is equal to or greater than a predetermined threshold (for a specified time) as a result of the scan, the AP 415 may be determined as neighboring. The processor 120 may identify at least one of information about the AP 415, a signal strength, QoS information, or a connection security attribute (e.g., whether the AP 415 is 'open' or protected with 'Wi-Fi protected access 2 (WPA2)'. According to an embodiment, when a specified condition occurs, the processor 120 may search for a neighboring AP capable of providing the tethering service to the external electronic device 410. For example, the specified condition may include a specified time, a tethering service request from the external electronic device 410, and/or movement of the electronic device 101.

In operation 1115, the processor 120 may determine whether the detected AP 415 may replace the tethering service. In an embodiment, the processor 120 may determine whether the detected AP 415 may replace the tethering service based on at least one of a received signal strength (e.g., a received signal strength indicator (RSSI)) of the AP 415, QoS information about the AP 415, or whether the external electronic device 410 is connectable to the AP 415. In an embodiment, when the signal strength of the AP 415 is equal to or greater than a threshold (e.g., for a specified time), and the QoS information about the AP 415 is suitable for servicing the external electronic device 410, the processor 120 may determine that the AP 415 may replace the tethering service.

In an embodiment, when an RSSI value obtained as a result of searching for the AP 415 is equal to or greater than a threshold (e.g., for a specified time), the processor 120 may attempt a direct connection to the AP 415 and obtain QoS information from the AP 415 through a Wi-Fi connection to the AP 415. In an embodiment, the processor 120 may obtain the QoS information about the AP 415 through separate signaling without establishing a Wi-Fi connection with the AP 415 during the scan procedure. The QoS information may include QoS parameters for a wireless communication quality that the AP 415 is capable of providing. In an embodiment, the QoS information may include at least one of an RF band (e.g., 2.4 GHz or 5 GHz), a queue size, an arbitration inter-frame space, a minimum/maximum contention window, a maximum burst size, or Wi-Fi multimedia enable. The processor 120 may determine whether the AP 405 is suitable for processing the Internet connection of the external electronic device 410 based on the QoS parameters included in the QoS information about the AP 415. For example, when the external electronic device 410 uses a streaming service through the tethering service, the processor 120 may determine whether the QoS parameters of the AP 415 are sufficient to support the streaming service. That is, when it is said that QoS information is suitable, this may mean that the QoS parameters included in the QoS information are suitable for processing the Internet connection of the external electronic device 410 in embodiments of the disclosure.

In an embodiment, when an additional special authentication procedure is required for connection to the AP 415, and the external electronic device 410 does not support the special authentication procedure, the processor 120 may determine that the AP 415 is not capable of replacing the tethering service. For example, the AP 415 may be configured to allow only a connection of an STA subscribed to a specific communication service provider through the special authentication procedure. For example, the AP 415 may be configured to allow only a connection of an STA of a user subscribed to a specific service or rate plan through the special authentication procedure. In this case, even though the processor 120 transmits information about the AP 415 to the external electronic device 410, the external electronic device 410 may not be able to connect to the AP 415. Accordingly, in this case, it may be determined that replacement of the tethering service by the AP 415 is impossible. In an embodiment, when the processor 120 does not know whether the AP 415 is capable of replacing the tethering service, the processor 120 may transmit the information about the AP 415 to the external electronic device 410 so that the external electronic device 410 may directly attempt to connect to the AP 415. In an embodiment, when there are two or more detected APs, the processor 120 may transmit information about the two or more APs to the external electronic device 410 so that the external electronic device 410 may select an accessible AP from among the APs.

In an embodiment, the processor 120 may determine whether to transmit configuration information about the AP 415 to the external electronic device 410 according to the battery level and/or radio channel quality of the processor 120, independently of or additionally to the connectivity and replacement availability of the AP 415. For example, when the battery level of the processor 120 is less than a first threshold, and/or when the quality of a cellular or Wi-Fi radio channel of the electronic device 405 is less than a second threshold, and/or when the amount of remaining data available to provide the tethering service through cellular communication of the electronic device 405 is less than a third threshold, the processor 120 may determine to transmit the configuration information about the AP 415 to the external electronic device 410 to induce Wi-Fi handover of the external electronic device 410.

In operation 1120, the processor 120 may transmit the configuration information about the AP 415 to the external electronic device 410. In an embodiment, the processor 120 may perform the DPP authentication procedure (operations 921 to 931) and the DPP configuration procedure (operations 933 to 937) illustrated in FIG. 9 on the external electronic device 410, and include information required for connection to the AP 415 in a configuration object of a DPP configuration response frame transmitted to the external electronic device 410 (operation 935) during the DPP configuration procedure. In an embodiment, the configuration information may include at least one of connector information about the AP 415, a C-sign key, an existing PSK, or a passphrase.

Subsequent operations 1125 and 1130 may be selectively performed. For example, when the hotspot function is configured to be deactivated in the absence of a connection of the external electronic device (e.g., the external electronic device 410) using the tethering service through the hotspot, the processor 120 may perform operations 1125 and 1130.

In operation 1125, after transmitting the configuration information and terminating the connection to the external electronic device 410, the processor 120 may monitor whether a connection using the tethering service exists through the hotspot for a predetermined time period N. When there is no hotspot connection for the time period N, the processor 120 may determine not to need to maintain the tethering service any longer and deactivate the mobile hotspot mode in operation 1130. In an embodiment, when the external electronic device 410 performs Wi-Fi handover from the processor 120 by connecting to an available AP (e.g., the AP 415) by an optimal AP selection operation, the connection between the electronic device 405 and the external electronic device 410 may be terminated. In an embodiment, the external electronic device 410 may select a new AP, while maintaining the connection to the electronic device 405. For example, an AP having a largest received signal strength or an AP having highest network QoS may be a criterion for AP selection. The external electronic device 410 may internally select a most suitable AP according to its own criterion. When the external electronic device 410 is disconnected and there is no electronic device using the tethering service, the processor 120 may automatically deactivate the mobile hotspot mode after the time period N and thus reduce unnecessary power consumption of the electronic device 405.

In an embodiment, the electronic device 405 may refer to a DPP status field in a DPP configuration result frame received from the external electronic device 410 as a criterion for determining that the connection to the external electronic device 410 has been terminated. The electronic device 405 may request the external electronic device 410 to provide a feedback by including a sendConnStatus attribute in a DPP configuration response frame transmitted to the external electronic device 410, and when receiving the DPP configuration response frame, the external electronic device 410 may transmit a DPP configuration result frame including a DPP status field indicating the status of an attempt to connect to the AP 415. When the result value of the DPP status field included in the DPP configuration result frame is STATUS_OK, the electronic device 405 may determine that the external electronic device 410 is capable of successfully using a connection service provided by the AP 415 and deactivate the mobile hotspot mode.

Figure 12:
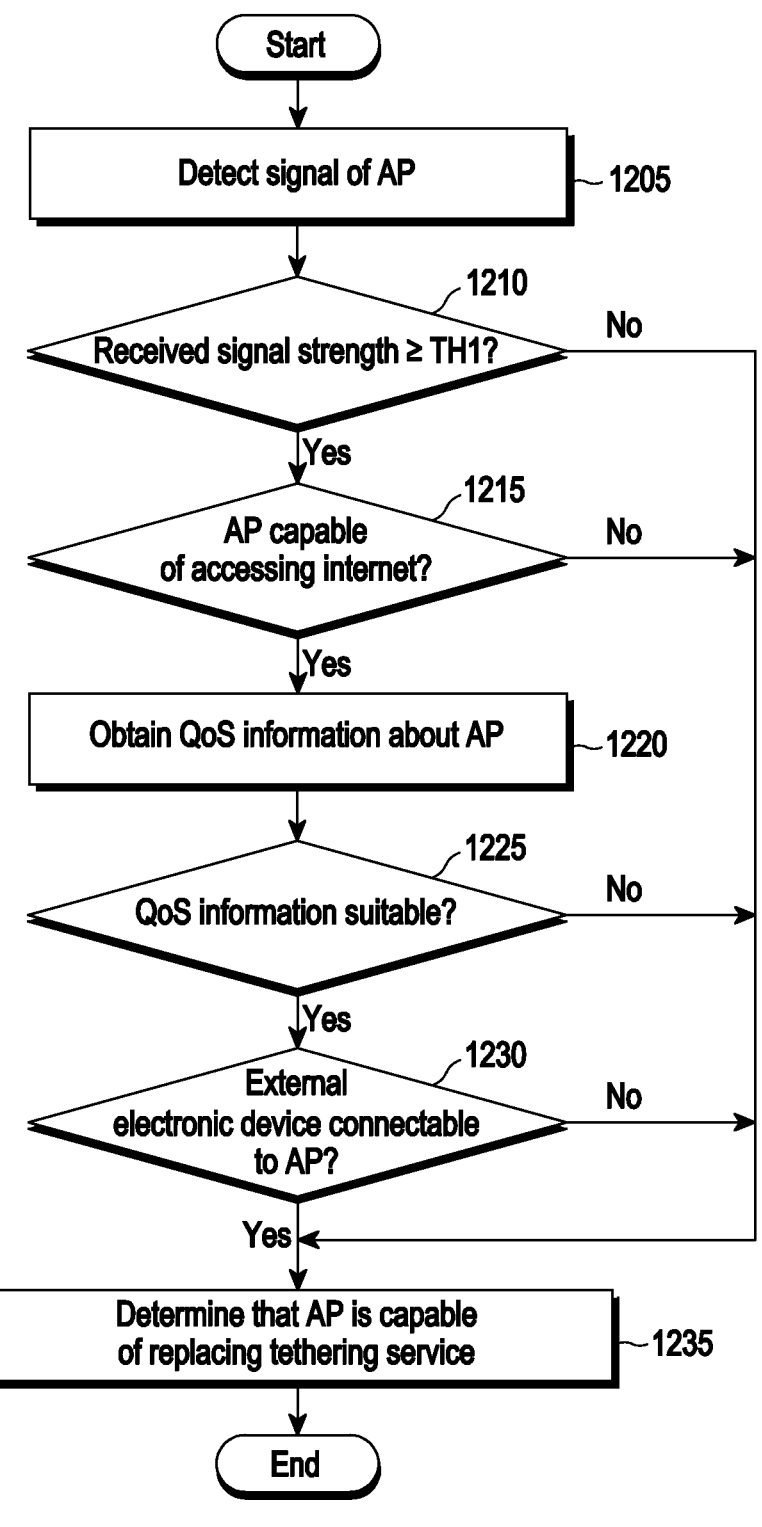
FIG. 12 is a flowchart illustrating an operation of determining whether an alternative AP exists according to various embodiments of the disclosure.

FIG. 12 is a flowchart illustrating an operation of determining whether an alternative AP exists (e.g., operation 1115 of FIG. 11) according to various embodiments of the disclosure. A procedure of the illustrated flowchart may be performed, for example, by the processor 120 included in the electronic device 101 of FIG. 1.

Referring to FIG. 12, in operation 1205, the processor 120 may detect a signal of the AP 415 as a result of searching for a neighboring AP. In operation 1210, the processor 120 may determine whether a received signal strength of the AP 415 is equal to or greater than a predetermined threshold TH1 (e.g., for a specified time). When the received signal strength of the AP 415 is equal to or greater than the threshold, the processor 120 may determine whether the AP 415 is in a state in which it is capable of accessing the Internet by signaling obtained through a scan procedure in operation 1215. When the AP 415 is capable of accessing the Internet, the processor 120 may obtain QoS information about the AP 415 in operation 1220, and determine whether QoS parameters included in the QoS information are suitable for servicing the external electronic device 410 in operation 1225. For example, the processor 120 may determine whether the AP 415 is capable of providing data communication being used by the external electronic device 410 through the electronic device 405. In an embodiment, when the QoS information about the AP 415 is obtained during the scan procedure, operation 1220 may be omitted. When the QoS information about the AP 415 is appropriate, the processor 120 may determine whether the external electronic device 410 is connectable to the AP 415 in operation 1230. In an embodiment, when a special authentication procedure (e.g., defined by a communication service provider) is required for connection to the AP 415, and the external electronic device 410 does not support the special authentication procedure, the processor 120 120 may determine that the external electronic device 410 is not connectable to the AP 415. When the external electronic device 410 is connectable to the AP 415, the processor 120 may determine that the AP 410 is capable of replacing the tethering service of the electronic device 405 in operation 1235.

While operations 1210, 1215, 1220, 1225, and 1230 are shown in order, at least some of the operations may be omitted or combined, or the order of the above operations may be changed according to various embodiments. When one of operations 1210, 1215, 1220, 1225, and 1230 is not satisfied, the processor 120 may determine that the tethering service through the AP 415 is impossible for the external electronic device 410.

Figure 13:
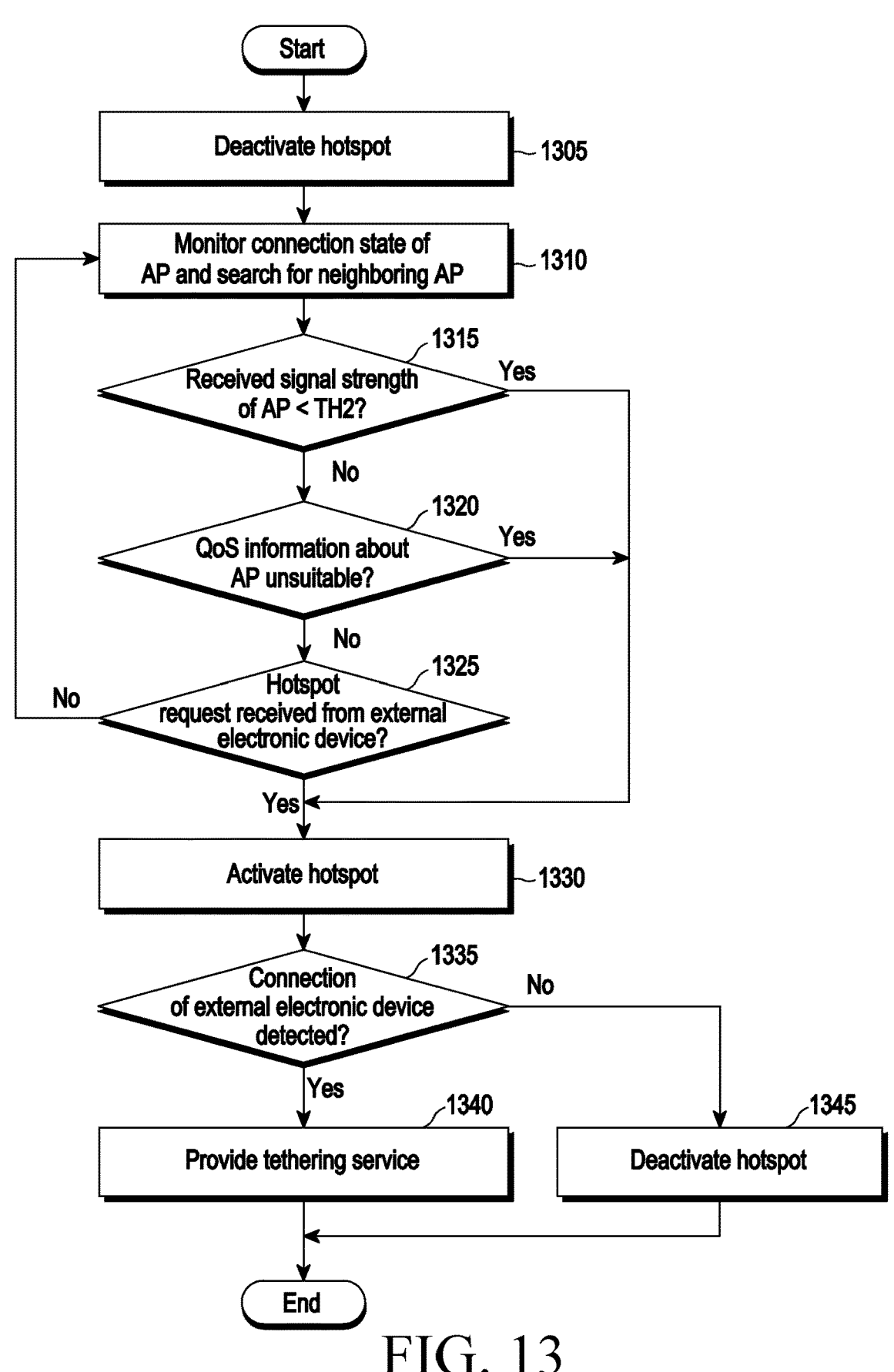
FIG. 13 is a flowchart illustrating a procedure of activating a mobile hotspot mode according to various embodiments of the disclosure.

FIG. 13 is a flowchart illustrating a procedure of activating a mobile hotspot mode according to various embodiments of the disclosure. The procedure of the illustrated flowchart may be performed by the processor 120 included in the electronic device 101 of FIG. 1, for example.

Referring to FIG. 13, in operation 1305, the processor 120 may provide configuration information about the AP 415 to the external electronic device 410 as in operation 1120 of FIG. 11 and deactivate the mobile hot spot mode as in operation 1130 of FIG. 11. In an embodiment, the processor 120 may maintain a listen state to receive a DPP frame transmitted from the external electronic device 410 for a specified time after the mobile hotspot mode is deactivated. In another embodiment, the processor 120 may maintain the listen state to receive a DPP frame transmitted from the external electronic device 410 for the specified time or a specified period after the mobile hotspot mode is deactivated. In operation 1310, the processor 120 may search for a neighboring AP and continuously monitor the connection state of the AP 415 and QoS information about the AP 415. In operations 1315 to 1325, the processor 120 may identify whether there is a problem with the connectivity of the AP 415 by monitoring the connectivity of the AP 415, for example, a signal strength and/or network QoS of the AP 415 which has provided the configuration information about the AP 415 to the external electronic device 410.

In an embodiment, in operation 1315, the processor 120 may determine whether the received signal strength of the AP 415 is less than a predetermined threshold TH2 (e.g., for a specified time). When the received signal strength of the AP 415 is less than the threshold, the mobile hotspot mode of the processor 120 may be activated in operation 1330. When the received signal strength of the AP 415 is not less than the threshold, the processor 120 may obtain QoS information about the AP 415, and determine whether QoS parameters included in the QoS information are suitable for servicing the external electronic device 410 in operation 1320. When determining that the QoS information is not suitable, the processor 120 may activate the mobile hotspot mode of the electronic device 405 in operation 1330. When determining that the QoS information is suitable, the processor 120 may determine whether a hotspot request for requesting the tethering service has been received from the external electronic device 410 in operation 1325. In an embodiment, the hotspot request may be transmitted from the external electronic device 410 to the electronic device 405 by the DPP. When the hotspot request has been received from the external electronic device 410, the mobile hotspot mode of the electronic device 405 may be activated in operation 1330. Otherwise, the processor 120 may return to operation 1310. Although operations 1315, 1320, and 1325 are shown in order herein, at least some of the above operations may be omitted or combined, or the order of the above operations may be changed according to various embodiments.

In operation 1330, the mobile hotspot mode of the electronic device 405 may be activated. For example, the processor 120 may activate a hotspot of the communication module 302, when receiving the hotspot request from the external electronic device 410 or as a result of monitoring the connection state of the AP 415. In operation 1335, the processor 120 may detect whether the external electronic device 410 has been connected to the tethering service through the mobile hotspot mode. When detecting the connection of the external electronic device 410, the processor 120 may provide the external electronic device 410 with an Internet connection through the tethering service in operation 1345. On the contrary, when failing to detect the connection of the external electronic device 410 for a specified time, the processor 120 may deactivate the mobile hotspot mode again in operation 1340.

In an embodiment, while the external electronic device 410 connects to the AP 415 based on the configuration information provided from the electronic device 405 and uses the Internet through the AP 415, the external electronic device 410 may detect that there is a problem with the connectivity of the AP 415 based on a received signal strength of the AP 415 and/or QoS information about the AP 415. When determining that there is a problem with the connectivity of the AP 415, the external electronic device 410 may search neighboring APs for Wi-Fi handover and when detecting the mobile hotspot of the electronic device 405 as a result of the search, proceed to connect to the electronic device 410 and terminate the connection to the AP 415.

The operation of attempting to reconnect to the electronic device 405 in the mobile hotspot mode through discovery of a neighboring AP by the external electronic device 410 may include selecting an optimized AP based on previous network information stored by the external electronic device 410 and changing the connection, and an AP selection criterion optimized for the external electronic device 410 may be used. In an embodiment, the external electronic device 410 may select a last connected AP, for example, the electronic device 405 in the mobile hotspot mode, with priority. In an embodiment, the external electronic device 410 may select an AP having a largest received signal strength, for example, the electronic device 405 in the mobile hotspot mode, with priority.

Figure 14:
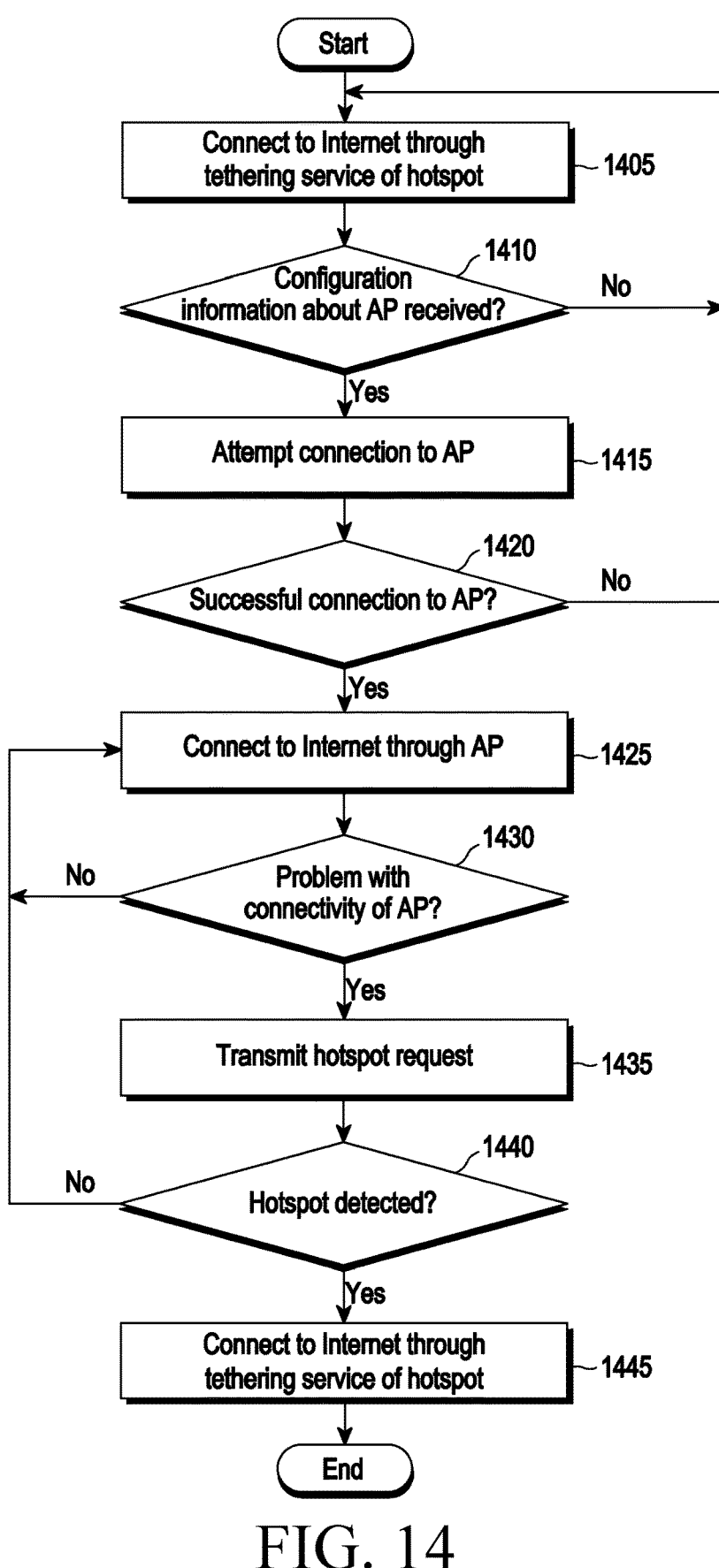
FIG. 14 is a flowchart illustrating a procedure of transmitting a hotspot request by an external electronic device according to various embodiments of the disclosure.

FIG. 14 is a flowchart illustrating a procedure of transmitting a hotspot request by an external electronic device according to various embodiments of the disclosure. The procedure of the illustrated flowchart may be performed, for example, by the processor 120 included in the electronic device 101 of FIG. 1.

Referring to FIG. 14, in operation 1405, an external electronic device (e.g., the external electronic device 410 of FIG. 4B) is connected to the Internet through a tethering service from an electronic device (e.g., the electronic device 405 of FIG. 4B) in a mobile hotspot mode. The external electronic device 410 may receive configuration information about the AP 415 from the electronic device 405 in operation 1410, and attempt to connect to the AP 415 using the configuration information in operation 1415. In an embodiment, when receiving the configuration information about the AP 415 from the electronic device 405 using the DPP while using the tethering service of the electronic device 405, the external electronic device 410 may perform Wi-Fi handover to the AP 415 using the configuration information.

In operation 1420, the external electronic device 410 may determine whether it has succeeded in connecting to the AP 415, and when it has succeeded in connecting to the AP 415, proceed to operation 1425. On the contrary, when it has failed in connecting to the AP 415, the external electronic device 410 may return to operation 1405 to continue using the tethering service of the electronic device 405. In operation 1425, the external electronic device 410 may connect to the Internet through the AP 415 and use the Internet service.

In operation 1430, the external electronic device 410 may determine whether there is a problem with the connectivity of the AP 415 during the connection to the AP 415. In an embodiment, the external electronic device 410 may evaluate the connectivity of the AP 415 based on a received signal strength of the AP 415 and/or QoS information about the AP 415. When the received signal strength of the AP 415 is equal to or greater than a threshold, and the QoS information is suitable for the Internet service used by the external electronic device 410, the external electronic device 410 may determine that there is no problem with the connectivity of the AP 415. When determining that a problem has occurred to the connectivity of the AP 415, the external electronic device 410 may request the electronic device 405 which was connected before the connection to the AP 415 to activate the mobile hotspot mode by transmitting a hotspot request based on pre-stored previous network information in operation 1435.

In an embodiment, the external electronic device 410 may use the DPP signal flow illustrated in FIG. 9 to request activation of the mobile hotspot mode. In an embodiment, the external electronic device 410 may transmit a DPP presence announcement frame to notify that a network configuration is required. When the electronic device 405 receives the DPP presence announcement frame and recognizes that a network configuration is required for the external electronic device 410, the electronic device 405 may perform the DPP configuration procedure (e.g., operations 933 to 937 of FIG. 9). To this end, the electronic device 405 may operate as a DPP initiator. In an embodiment, the external electronic device 410 may already know information about the electronic device 405 through a previous DPP configuration procedure. Therefore, the external electronic device 410 may operate as a DPP initiator, and the electronic device 405 may operate as a DPP responder. In an embodiment, the external electronic device 410 may request new AP configuration information from the electronic device 405, instead of transmitting a hotspot request in operation 1435, and the electronic device 405 may transmit configuration information about another available AP to the external electronic device 410. In this case, when the electronic device 405 determines that there is no other AP available to the external electronic device 410, the electronic device 405 may resume the tethering service for the external electronic device 410 by activating the mobile hotspot mode.

In operation 1440, the external electronic device 410 may search neighboring APs for handover. When detecting the electronic device 405 in the mobile hotspot mode as a result of the search, the external electronic device 410 may proceed to operation 1445 to establish a connection with the electronic device 405 and terminate the connection to the AP 415. When the external electronic device 410 is connected to the electronic device 405, the external electronic device 410 may connect to the Internet through the tethering service of the electronic device 405. When the external electronic device 410 is connected after the activation of the mobile hotspot mode, the electronic device 405 may provide the tethering service. When the external electronic device 410 is not connected for a specified time, the electronic device 405 may deactivate the mobile hotspot mode.

According to an embodiment, when the external electronic device 410 receives information about a plurality of accessible APs from the electronic device 405, in the case that a problem occurs in the connectivity of the connected AP (e.g., the AP 415), the external electronic device 410 may perform handover based on the information about the other APs in operation 1430. The external electronic device 410 may perform operation 1435, when there is no information about APs other than the current connected AP (e.g., the AP 415).

Various embodiments of the disclosure may provide an alternative Wi-Fi network to the external electronic device 410 connected as a client to the electronic device 405 in the mobile hotspot mode, and thus improve service quality through a direct AP connection of the external electronic device 410. According to various embodiments of the disclosure, when the external electronic device 410 needs a tethering service, the mobile hotspot mode of the electronic device 405 may be activated, thereby reducing current consumption of the electronic device 405.

According to an embodiment of the disclosure, a method of providing information about an AP by an electronic device in a wireless communication system may include providing a tethering service to an external electronic device in a mobile hotspot mode (e.g., operation 1105), searching for at least one AP capable of replacing the tethering service for the external electronic device, while providing the tethering service (e.g., operation 1110), and when the at least one AP is detected as a result of the search, transmitting configuration information about the at least one AP for connecting the external electronic device to connect to the at least one AP to the external electronic device (e.g., operation 1125).

According to an embodiment of the disclosure, the method may further include, when a received signal strength of the AP is equal to or greater than a specified threshold, and QoS information about the AP is suitable for servicing the external electronic device, determining to provide the configuration information about the AP to the external electronic device (e.g., operation 1115).

According to an embodiment of the disclosure, the method may further include, when the received signal strength of the AP is equal to or greater than the specified threshold (e.g., operation 1210), connecting the electronic device to the AP and receiving the QoS information about the AP from the AP (e.g., operation 1220).

According to an embodiment of the disclosure, the method may further include, when the AP is capable of accessing the Internet (e.g., operation 1215) and/or the external electronic device is connectable to the AP without an additional authentication procedure (e.g., operation 1230), providing the configuration information about the AP to the external electronic device.

According to an embodiment of the disclosure, the method may further include, when a battery level of the electronic device is less than a first threshold, a radio channel quality of the electronic device is less than a second threshold, and/or a remaining amount of data available for the electronic device to provide the tethering service is less than a third threshold, determining to provide the configuration information about the AP to the external device.

According to an embodiment of the disclosure, the configuration information may be transmitted to the external electronic device through a DPP configuration response frame of a Wi-Fi DPP (e.g., operation 935).

According to an embodiment of the disclosure, the method may further include, when there is no connection for the tethering service for a specified time (e.g., operation 1125) or a status field indicating successful connection to the AP is received from the external electronic device after transmitting the configuration information, deactivating the mobile hotspot mode (e.g., operation 1130).

According to an embodiment of the disclosure, the method may further include monitoring connectivity of the AP after deactivating the mobile hotspot mode (e.g., operation 1310), and when a received signal strength of the AP is less than a first threshold (e.g., operation 1315), QoS information about the AP is not suitable for servicing the external electronic device (e.g., operation 1320), and/or a hotspot request for requesting the tethering service is received from the external electronic device (e.g., operation 1325), activating the mobile hotspot mode (e.g., operation 1330).

According to an embodiment of the disclosure, the method may further include, when the external electronic device is not connected to the tethering service of the mobile hotspot mode for a specified time after activating the mobile hotspot mode (e.g., operation 1335), deactivating the mobile hot spot mode (e.g., operation 1345).

According to an embodiment of the disclosure, the hotspot request may be received from the external electronic device through a DPP presence announcement frame of a Wi-Fi DPP (e.g., operation 911 or operation 917).

What is claimed is:

1. An electronic device comprising:
communication circuitry;
memory storing instructions; and
at least one processor functionally connected to the communication circuitry and the memory,
wherein the instructions, when executed by the at least one processor individually or collectively, cause the electronic device to:
provide a tethering service to an external electronic device through the communication circuitry in a mobile hotspot mode,
search for at least one access point (AP) capable of replacing the tethering service for the external electronic device through the communication circuitry while providing the tethering service, and
based on at least one of a received signal strength of the at least one AP being equal to or greater than a specified threshold or a quality of service (QOS) information about the at least one AP being suitable for servicing the external electronic device, transmit, through the communication circuitry to the external electronic device, configuration information about the at least one AP for connecting the external electronic device to the at least one AP.

2. The electronic device of claim 1, wherein the instructions, when executed by the at least one processor individually or collectively, cause the electronic device to connect the electronic device to the at least one AP and receive the QoS information about the at least one AP from the at least one AP through the communication circuitry based on the received signal strength of the at least one AP being equal to or greater than the specified threshold.

3. The electronic device of claim 1, wherein the instructions, when executed by the at least one processor individually or collectively, cause the electronic device to determine to provide the configuration information about the at least one AP to the external electronic device based on the at least one AP being capable of accessing Internet or the external electronic device being connectable to the at least one AP without an additional authentication procedure.

4. The electronic device of claim 1, wherein the instructions, when executed by the at least one processor individually or collectively, cause the electronic device to deactivate the mobile hotspot mode based on a battery level of the electronic device being less than a first threshold, a radio channel quality of the electronic device being less than a second threshold, or a remaining amount of data available for the electronic device to provide the tethering service being less than a third threshold.

5. The electronic device of claim 1, wherein the configuration information is transmitted to the external electronic device through a device provisioning protocol (DPP) configuration response frame of a wireless fidelity (Wi-Fi) DPP.

6. The electronic device of claim 1, wherein the instructions, when executed by the at least one processor individually or collectively, cause the electronic device to deactivate the mobile hotspot mode based on there being no connection for the tethering service for a specified time or a status field indicating successful connection to the at least one AP being received from the external electronic device after transmitting the configuration information.

7. The electronic device of claim 6, wherein the instructions, when executed by the at least one processor individually or collectively, cause the electronic device to:

monitor connectivity of the at least one AP after deactivating the mobile hotspot mode, and activate the mobile hotspot mode based on the received signal strength of the at least one AP being less than a first threshold, QoS information about the at least one AP not being suitable for servicing the external electronic device, or a hotspot request for requesting the tethering service is received from the external electronic device.

8. The electronic device of claim 7, wherein the instructions, when executed by the at least one processor individually or collectively, cause the electronic device to deactivate the mobile hotspot mode based on the external electronic device not being connected to the tethering service of the mobile hotspot mode for the specified time after activating the mobile hotspot mode.

9. The electronic device of claim 7, wherein the hotspot request is received from the external electronic device through a DPP presence announcement frame of a Wi-Fi DPP.

10. A method of providing information about an access point (AP) by an electronic device in a wireless communication system, the method comprising:

providing a tethering service to an external electronic device in a mobile hotspot mode;

searching for at least one access point (AP) capable of replacing the tethering service for the external electronic device while providing the tethering service; and based on at least one of a received signal strength of the at least one AP being equal to or greater than a specified threshold or a quality of service (QoS) information about the at least one AP being suitable for servicing the external electronic device, transmitting, to the external electronic device, configuration information about the at least one AP for connecting the external electronic device to the at least one AP.

11. The method of claim 10, further comprising at least one of:

connecting the electronic device to the at least one AP and receiving the QoS information about the at least one AP from the at least one AP based on the received signal strength of the AP being equal to or greater than the specified threshold, or determining to provide the configuration information about the at least one AP to the external electronic device based on the at least one AP being capable of accessing Internet or the external electronic device being connectable to the at least one AP without an additional authentication procedure, wherein the configuration information is transmitted to the external electronic device through a device provisioning protocol (DPP) configuration response frame of a wireless fidelity (Wi-Fi) DPP.

12. The method of claim 10, further comprising, determining to provide the configuration information about the at least one AP to the external electronic device based on a battery level of the electronic device being less than a first threshold, a radio channel quality of the electronic device being less than a second threshold, or a remaining amount of data available for the electronic device to provide the tethering service being less than a third threshold.

13. The method of claim 10, further comprising, deactivating the mobile hotspot mode based on there being no connection for the tethering service for a specified time or a status field indicating successful connection to the at least one AP being received from the external electronic device after transmitting the configuration information.

14. The method of claim 13, further comprising:

monitoring connectivity of the at least one AP after deactivating the mobile hotspot mode, activating the mobile hotspot mode based on the received signal strength of the at least one AP being less than a first threshold, QoS information about the at least one AP not being suitable for servicing the external electronic device, or a hotspot request for requesting the tethering service being received from the external electronic device, and deactivating the mobile hotspot mode based on the external electronic device not being connected to the tethering service of the mobile hotspot mode for the specified time after activating the mobile hotspot mode, wherein the hotspot request is received from the external electronic device through a DPP presence announcement frame of a Wi-Fi DPP.

15. A non-transitory computer-readable medium having recorded thereon a program for implementing an operating method of an electronic device to provide information about an access point (AP), the operating method comprising:

providing a tethering service to an external electronic device in a mobile hotspot mode;

searching for at least one access point (AP) capable of replacing the tethering service for the external electronic device while providing the tethering service; and based on at least one of a received signal strength of the at least one AP being equal to or greater than a specified threshold or a quality of service (QoS) information about the at least one AP being suitable for servicing the external electronic device, transmitting, to the external electronic device, configuration information about the at least one AP for connecting the external electronic device to the at least one AP.

16. The non-transitory computer-readable medium of claim 15, wherein the operating method further comprises:

connecting the electronic device to the at least one AP and receiving the QoS information about the at least one AP from the at least one AP based on the received signal strength of the AP being equal to or greater than the specified threshold, or determining to provide the configuration information about the at least one AP to the external electronic device based on the at least one AP being capable of accessing Internet or the external electronic device being connectable to the at least one AP without an additional authentication procedure, wherein the configuration information is transmitted to the external electronic device through a device provisioning protocol (DPP) configuration response frame of a wireless fidelity (Wi-Fi) DPP.

17. The non-transitory computer-readable medium of claim 15, wherein the operating method further comprises determining to provide the configuration information about the at least one AP to the external electronic device based on a battery level of the electronic device being less than a first threshold, a radio channel quality of the electronic device being less than a second threshold, or a remaining amount of data available for the electronic device to provide the tethering service being less than a third threshold.

18. The non-transitory computer-readable medium of claim 15, wherein the operating method further comprises deactivating the mobile hotspot mode based on there being no connection for the tethering service for a specified time or a status field indicating successful connection to the at least one AP being received from the external electronic device after transmitting the configuration information.

19. The non-transitory computer-readable medium of claim 18, wherein the operating method further comprises:

monitoring connectivity of the at least one AP after deactivating the mobile hotspot mode, activating the mobile hotspot mode based on the received signal strength of the at least one AP being less than a first threshold, QoS information about the at least one AP not being suitable for servicing the external electronic device, or a hotspot request for requesting the tethering service being received from the external electronic device, and deactivating the mobile hotspot mode based on the external electronic device not being connected to the tethering service of the mobile hotspot mode for the specified time after activating the mobile hotspot mode.

* * * * *